(12) United States Patent
Kushwah et al.

(10) Patent No.: US 11,966,361 B2
(45) Date of Patent: *Apr. 23, 2024

(54) REDUCING STABLE DATA EVICTION WITH SYNTHETIC BASELINE SNAPSHOT AND EVICTION STATE REFRESH

(71) Applicant: NetApp Inc., San Jose, CA (US)

(72) Inventors: Ajay Pratap Singh Kushwah, San Ramon, CA (US); Ling Zheng, Saratoga, CA (US); Sharad Jain, Santa Clara, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/536,515

(22) Filed: Nov. 29, 2021

(65) Prior Publication Data

US 2022/0083505 A1 Mar. 17, 2022

Related U.S. Application Data

(63) Continuation of application No. 16/435,829, filed on Jun. 10, 2019, now Pat. No. 11,188,500, which is a (Continued)

(51) Int. Cl.
*G06F 16/11* (2019.01)
*G06F 11/14* (2006.01)
(Continued)

(52) U.S. Cl.
CPC ........ *G06F 16/128* (2019.01); *G06F 11/1448* (2013.01); *G06F 11/1464* (2013.01);
(Continued)

(58) Field of Classification Search
CPC .............. G06F 16/128; G06F 11/1448; G06F 11/1464; G06F 12/121; G06F 16/13; H04L 67/568

See application file for complete search history.

(56) References Cited

U.S. PATENT DOCUMENTS 7,216,135 B2 * 5/2007 Sawdon .................. G06F 16/10
7,694,191 B1 4/2010 Bono et al.
(Continued)

FOREIGN PATENT DOCUMENTS

CN 104933133 A 9/2015
EP 1349088 A2 10/2003
(Continued)

OTHER PUBLICATIONS

First Chinese Office Action cited in Chinese Application No. 201780076961.2 dated Nov. 4, 2022, 7 pages.
(Continued)

*Primary Examiner* — Zhuo H Li
(74) *Attorney, Agent, or Firm* — Cooper Legal Group, LLC

(57) ABSTRACT

With a forever incremental snapshot configuration and a typical caching policy (e.g., least recently used), a storage appliance may evict stable data blocks of an older snapshot, perhaps unchanged data blocks of the snapshot baseline. If stable data blocks have been evicted, restore of a recent snapshot will suffer the time penalty of downloading the stable blocks for restoring the recent snapshot. Creating synthetic baseline snapshots and refreshing eviction data of stable data blocks can avoid eviction of stable data blocks and reduce the risk of violating a recovery time objective.

20 Claims, 21 Drawing Sheets

Related U.S. Application Data continuation of application No. 15/338,272, filed on Oct. 28, 2016, now Pat. No. 10,346,354.

(51) Int. Cl.
  *G06F 12/121* (2016.01)
  *G06F 16/13* (2019.01)
  *H04L 67/568* (2022.01)

(52) U.S. Cl.
  CPC .......... *G06F 12/121* (2013.01); *G06F 16/13* (2019.01); *H04L 67/568* (2022.05)

(56) References Cited

U.S. PATENT DOCUMENTS

| | | | |
|---|---|---|---|
| 8,190,835 B1 | 5/2012 | Yueh | |
| 8,190,836 B1 | 6/2012 | Zheng et al. | |
| 8,285,758 B1 | 10/2012 | Bono et al. | |
| 8,412,688 B1* | 4/2013 | Armangau | G06F 16/128 707/703 |
| 8,504,529 B1 | 8/2013 | Zhang et al. | |
| 8,515,911 B1 | 8/2013 | Zhou et al. | |
| 8,620,973 B1 | 12/2013 | Veeraswamy et al. | |
| 8,789,208 B1* | 7/2014 | Sundaram | G06F 3/0604 726/28 |
| 8,972,351 B1* | 3/2015 | Kumar | G06F 16/128 707/639 |
| 90,200,903 | 4/2015 | Vempati et al. | |
| 9,679,040 B1 | 6/2017 | Davis et al. | |
| 9,720,835 B1 | 8/2017 | Shilane et al. | |
| 10,282,099 B1 | 5/2019 | Kushwah et al. | |
| 10,346,354 B2 | 7/2019 | Kushwah et al. | |
| 10,635,548 B2 | 4/2020 | Kushwah et al. | |
| 11,188,500 B2 | 11/2021 | Kushwah et al. | |
| 11,768,803 B2 | 9/2023 | Jain et al. | |
| 2005/0066095 A1 | 3/2005 | Mullick et al. | |
| 2007/0266056 A1 | 11/2007 | Stacey et al. | |
| 2011/0258461 A1 | 10/2011 | Bates | |
| 2012/0084261 A1 | 4/2012 | Parab | |
| 2012/0159016 A1 | 6/2012 | Morita | |
| 2013/0110778 A1 | 5/2013 | Taylor et al. | |
| 2014/0006357 A1 | 1/2014 | Davis et al. | |
| 2014/0201737 A1 | 7/2014 | Mitkar et al. | |
| 2015/0261792 A1 | 9/2015 | Attarde et al. | |
| 2016/0188415 A1* | 6/2016 | Karinta | H04L 67/1097 707/654 |
| 2016/0188417 A1 | 6/2016 | Karinta et al. | |
| 2016/0231940 A1 | 8/2016 | Tabachnik et al. | |
| 2016/0314046 A1 | 10/2016 | Kumarasamy | |
| 2017/0123935 A1 | 5/2017 | Pandit et al. | |
| 2017/0212811 A1 | 7/2017 | Kashnikov et al. | |
| 2018/0121453 A1 | 5/2018 | Jain et al. | |
| 2021/0004353 A1* | 1/2021 | Jain | G06F 11/1448 |

FOREIGN PATENT DOCUMENTS

| | | |
|---|---|---|
| EP | 3477482 A2 | 5/2019 |
| WO | 2009019128 A1 | 2/2009 |
| WO | 2018081737 A1 | 5/2018 |

OTHER PUBLICATIONS

Search Report Chinese Office Action cited in Chinese Application No. 201780076961.2 dated Oct. 31, 2022, 1 page.

Int. Preliminary Report/Written Opinion cited in EP Application No. PCT/US2017/059079 dated Apr. 30, 2019, 10 pgs.

Int. Preliminary Report/Written Opinion cited in EP Application No. PCT/US2017/059090 dated Apr. 30, 2019, 7 pgs.

EP Search Report cited in Application No. EP18203033.8 dated Jul. 19, 2019, 9 pgs.

EP Search Report cited in Application No. EP180203064.3 dated Feb. 24, 2020, 8 pgs.

Int. Search Report/Written Opinion cited in Application No. PCT/US2017/059090 dated Feb. 2, 2018, 12 pgs.

Int. Search Report/Written Opinion cited in Application No. PCT/US2017/059079 dated Feb. 5, 2018, 15 pgs.

"Gnothi: Separating Data and Metadata for Efficient and Available Storage Replication", Jun. 2012, Yang Wang, Lorenzo Alvisi and Mike Dahlin, USNIX Association, Berkeley, CA Reprinted from the Internet at: [https://www.usenix.org/system/files/conference/atc12/atc12-final43.pdf, 12 pages.

Notice of Allowance dated May 24, 2023 for U.S. Appl. No. 17/029,920, filed Sep. 23, 2020, 8 pages.

* cited by examiner

REDUCING STABLE DATA EVICTION WITH SYNTHETIC BASELINE SNAPSHOT AND EVICTION STATE REFRESH

RELATED APPLICATION

This application claims priority to and is a continuation of U.S. patent application Ser. No. 16/435,829, titled "REDUCING STABLE DATA EVICTION WITH SYNTHETIC BASELINE SNAPSHOT AND EVICTION STATE REFRESH" and filed Jun. 10, 2019, which claims priority to and is a continuation of U.S. Pat. No. 10,346,354, titled "REDUCING STABLE DATA EVICTION WITH SYNTHETIC BASELINE SNAPSHOT AND EVICTION STATE REFRESH" and filed Oct. 28, 2016, which are incorporated herein by reference.

BACKGROUND

The disclosure generally relates to the field of data processing, and more particularly to database and file management or data structures.

An organization can specify a data management strategy in a policy(ies) that involves data recovery and/or data retention. For data recovery, an application or program creates a backup and restores the backup when needed. The Storage Networking Industry Association (SNIA) defines a backup as a "collection of data stored on (usually removable) non-volatile storage media for purposes of recovery in case the original copy of data is lost or becomes inaccessible; also called a backup copy." For data retention, an application or program creates an archive. SNIA defines an archive as "A collection of data objects, perhaps with associated metadata, in a storage system whose primary purpose is the long-term preservation and retention of that data." Although creating an archive may involve additional operations (e.g., indexing to facilitate searching, compressing, encrypting, etc.) and a backup can be writable while an archive may not be, the creation of both involves copying data from a source to a destination.

This copying to create a backup or an archive can be done differently. All of a defined set of data objects can be copied, regardless of whether they have been modified since the last backup to create a "full backup." Backups can also be incremental. A system can limit copying to modified objects to create incremental backups, either a cumulative incremental backup or a differential incremental backup. SNIA defines a differential incremental backup as "a backup in which data objects modified since the last full backup or incremental backup are copied." SNIA defines a cumulative incremental backup as a "backup in which all data objects modified since the last full backup are copied."

A data management/protection strategy can use "snapshots," which adds a point in time aspect to a backup. A more specific definition of a snapshot is a "fully usable copy of a defined collection of data that contains an image of the data as it appeared at a single instant in time." In other words, a snapshot can be considered a backup at a particular time instant. Thus, the different techniques for creating a backup can include different techniques for creating a snapshot. The SNIA definition further elaborates that a snapshot is "considered to have logically occurred at that point in time, but implementations may perform part or all of the copy at other times (e.g., via database log replay or rollback) as long as the result is a consistent copy of the data as it appeared at that point in time. Implementations may restrict point in time copies to be read-only or may permit subsequent writes to the copy."

An organization can use different backup strategies. A few backup strategies include a "periodic full" backup strategy and a "forever incremental" backup strategy. With the periodic full backup strategy, a backup application creates a full snapshot ("baseline snapshot") periodically and creates incremental snapshots between the periodically created full snapshots. With the forever incremental backup strategy, a backup application creates an initial snapshot that is a full snapshot and creates incremental snapshots thereafter.

Data management/protection strategies increasingly rely on cloud service providers. A cloud service provider maintains equipment and software without burdening customers with the details. The cloud service provider provides an application programming interface (API) to customers. The API provides access to resources of the cloud service provider without visibility of those resources.

BRIEF DESCRIPTION OF THE DRAWINGS

Embodiments of the disclosure may be better understood by referencing the accompanying drawings.

FIG. 10 is a flowchart of example operations for snapshot reclamation, while FIGS. 11-14 expand upon example operations within FIG. 10.

DESCRIPTION

The description that follows includes example systems, methods, techniques, and program flows that embody embodiments of the disclosure. However, it is understood that this disclosure may be practiced without these specific details. For instance, this disclosure refers to data blocks in illustrative examples. But data of a snapshot may be referred to as a data segments, data objects, data units, etc. In other instances, well-known instruction instances, protocols, structures and techniques have not been shown in detail in order not to obfuscate the description.

Overview

A data management application creates a snapshot by copying data from a data source, which may be a primary or secondary storage (e.g., backup servers), to an intermediate storage destination. This intermediate storage destination can be a storage appliance between the data source and a private or public cloud storage (i.e., storage hosted and/or managed by a cloud service provider). The storage appliance is the destination for the snapshots from the perspective of the data source, but operates as a cache for snapshots to be ultimately stored in cloud storage. A snapshot that has not been evicted from the storage appliance can be expeditiously restored from the storage appliance. The storage appliance can also efficiently respond to at least metadata related requests because the storage appliance maintains metadata for snapshots, both cached and evicted snapshots. However, restoring a snapshot with data that has been evicted from the storage appliance will incur the cost of the time to download the evicted data from cloud storage. With a forever incremental snapshot configuration and a typical caching policy (e.g., least recently used), the storage appliance may evict stable data blocks (i.e., data blocks that have not changed across multiple snapshots) of an older snapshot, which may be unchanged data blocks of the snapshot baseline. If stable data blocks have been evicted, restore of a recent snapshot will suffer the time penalty of downloading the stable blocks for restoring the recent snapshot. Creating synthetic baseline snapshots and refreshing eviction data of stable data blocks can avoid eviction of stable data blocks and reduce the risk of violating a RTO.

Example Illustrations of Snapshot Layout on Cloud Cache Storage Appliance

Figure 1:
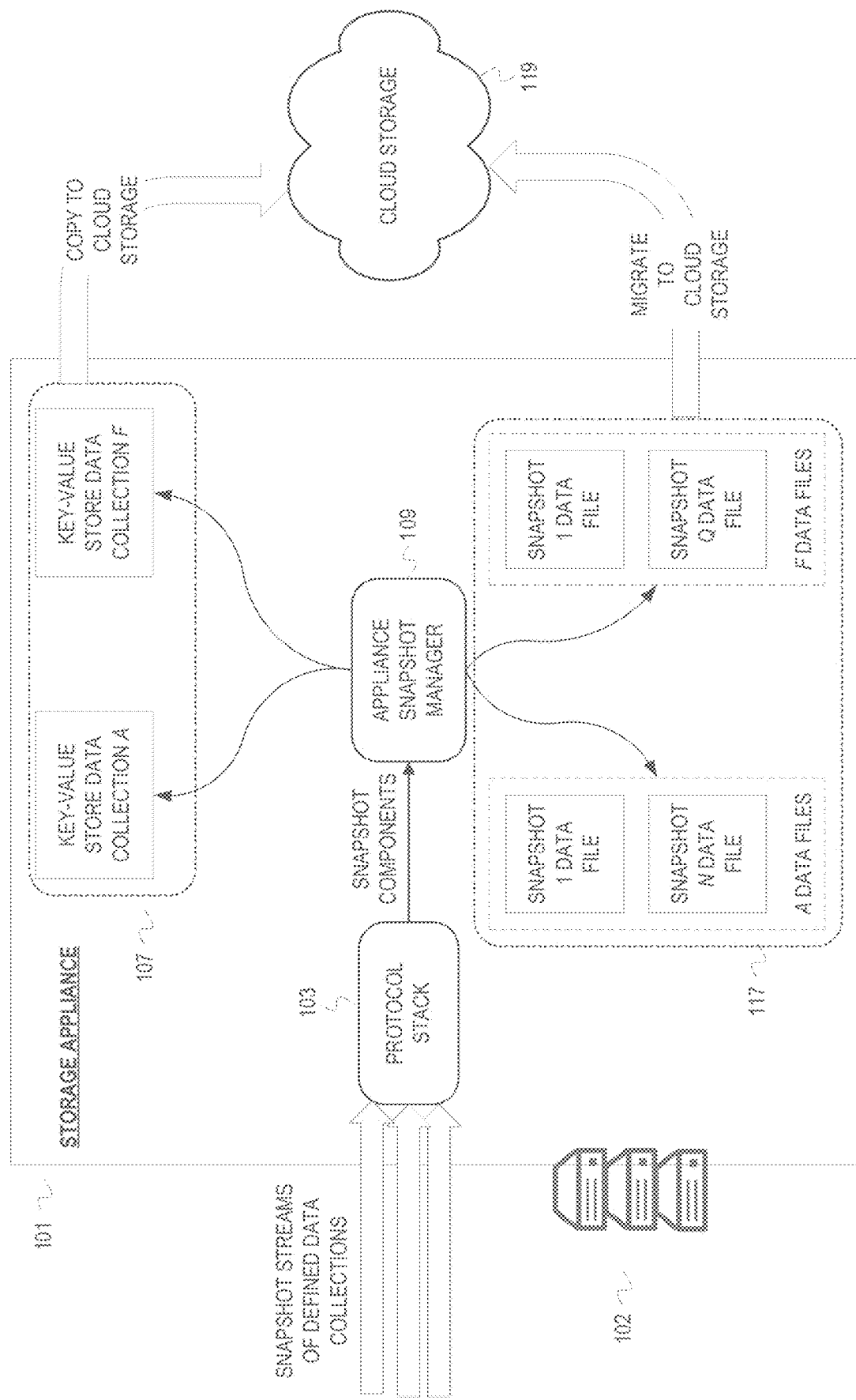
FIG. 1 is a diagram of an example storage appliance that arranges snapshot metadata into key-value stores for each defined data collection for which a snapshot is received.

FIG. 1 is a diagram of an example storage appliance that arranges snapshot metadata into key-value stores for each defined data collection for which a snapshot is received. A storage appliance 101 includes or is communicatively coupled with an array of storage devices 102 (e.g., a disk array, a flash storage bank, a hybrid storage array, etc.). The storage appliance 101 can use some or all of the storage device array 102 to cache data from a data source that is eventually evicted to a cloud storage 119. The storage appliance 101 includes a protocol stack 103 and an appliance snapshot manager 109.

The protocol stack 103 is a stack of software that, in this illustration, processes data streams of snapshots ("snapshot streams") for defined data collections. A defined data collection is an identifiable collection of data that can be a volume, partition, virtual disk, file system instance, etc. The protocol stack 103 performs communication/network protocol processing, and possible additional protocol processing to extract snapshot components from the snapshot streams. A snapshot component can be a message, object, operation, etc., that indicates whether the information in the snapshot relates to data or metadata, a directory change, an inode metadata change, etc. The protocol stack 103 extracts and formats the snapshot components for processing by the appliance snapshot manager 109. The protocol stack 103 may process snapshot streams across multiple connections from multiple data sources. The protocol stack 103 performs handshaking operations with a data source to exchange information about a defined data collection and snapshots available at the storage appliance 101 for the defined data collection.

The appliance snapshot manager 109 arranges snapshot metadata and snapshot data received from the protocol stack 103. The appliance snapshot manager 109 arranges the snapshot metadata into an appropriate one of the key-value stores 107 maintained by the appliance snapshot manager 109. In this example illustration, separate key-value stores are maintained by defined data collection. Examples of the snapshot metadata include inode attributes, directory information, and location information of data blocks within snapshot data files. The appliance snapshot manager 109 maintains snapshot data files 117 by snapshot and by defined data collection. The appliance snapshot manager 109 can arrange the snapshot data files by deriving a file naming scheme for each snapshot data file that is based on locally generated snapshot identifiers. The appliance snapshot manager 109 stores the snapshot data files in the array 102, and can store the snapshot data files into paths (e.g., folders, directories, etc.) that align with the different defined data collections. Similarly, the appliance snapshot manager 109 stores the snapshot metadata 107 in the array 102 and can arrange them by filenames based on the defined data collection identifiers and a different path for each defined data collection. The storage appliance 101 migrates the snapshot data files to the cloud storage 119 after the files are closed, which occurs after a snapshot stream ends. Migrating the data to cloud storage 119 can include one or more data management/efficiency operations, such as deduplication, compression, and/or encryption. The storage appliance 101, however, maintains the snapshot metadata and copies the snapshot metadata to the cloud storage 119. The storage appliance 101 can copy the metadata to the cloud storage 119, but can also apply data management/efficiency operations to the metadata and write the modified metadata to the cloud storage 119.

Figure 2:
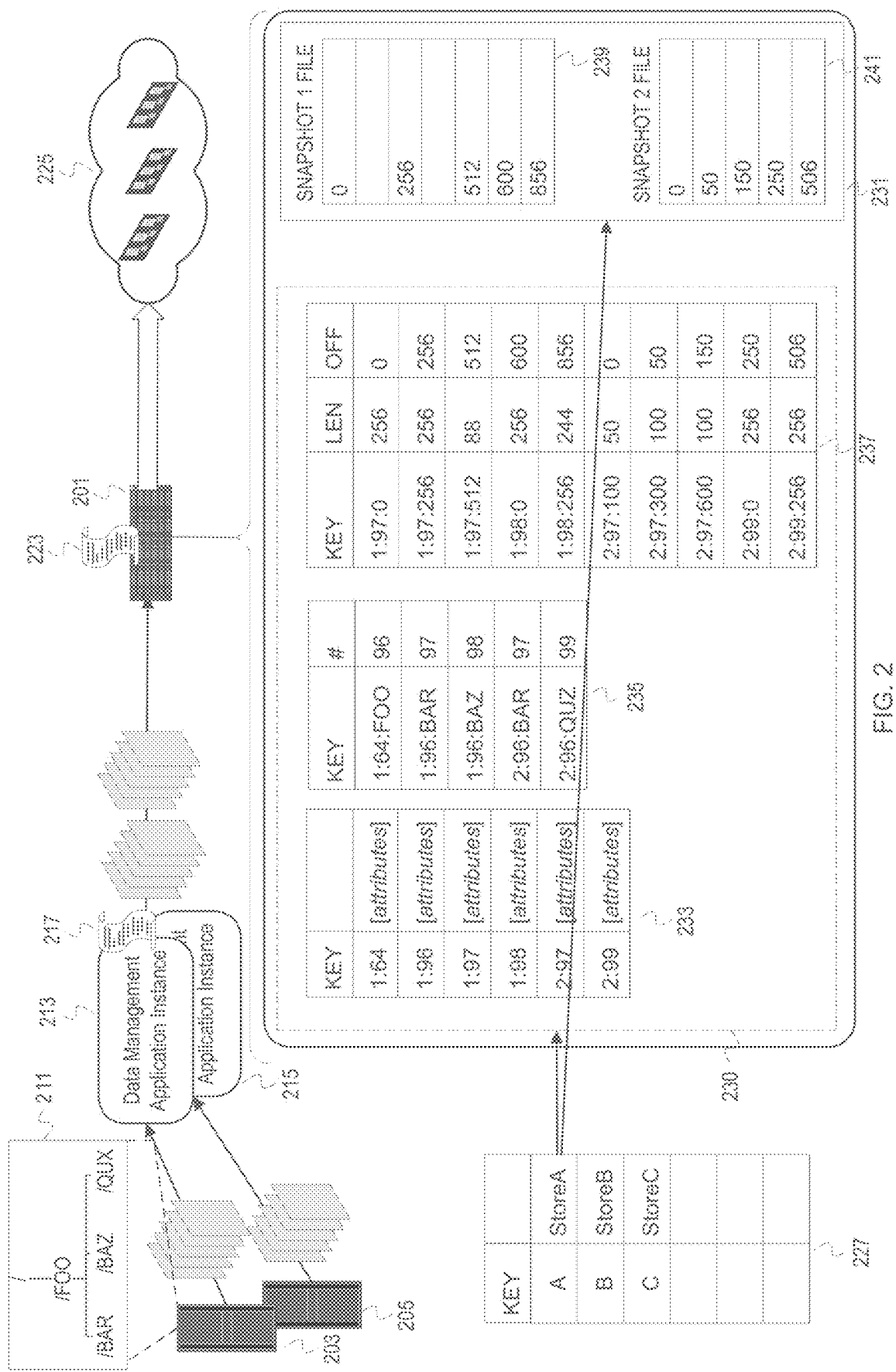
FIG. 2 is a diagram of snapshot metadata in a key-value store maintained at a storage appliance.

FIG. 2 is a diagram of snapshot metadata in a key-value store maintained at a storage appliance. In FIG. 2, a data source 203 and a data source 205 backup data to a data management application instance 213 and a data management application instance 215, respectively. The data management application instances 213, 215 may be running on the data sources 203, 205 or on other devices. The data management application instances 213, 215 may be instances of a standalone application (e.g., backup application) or instances of a component of an application or operating system. FIG. 2 depicts a portion 211 of an example defined data collection on the data source 203. The portion 211 includes a root directory, a child directory "FOO" and three files in the child directory: BAR, BAZ, and QUX. The data management application instances 213, 215 communicate forever incremental snapshot streams to a cloud cache storage appliance 201 according to a policy 217. The policy 217 can specify the snapshot paradigm, data collection restrictions, service level objectives, time period per snapshot, etc. The storage appliance 201 manages the received snapshots according to a policy 223. The policy 223 can specify a retention amount or retention time for snapshots to be available from the storage appliance 201, deduplication parameters, data archive requirements, data security parameters, etc. The storage appliance 201 archives snapshots into a cloud storage 225 according to the policy 223.

When the storage appliance 201 receives a snapshot, the storage appliance 201 inserts snapshot metadata records into the appropriate key-value store and writes corresponding data blocks into snapshot data files. The storage appliance 201 uses a global map 227 to resolve a defined data collection identifier "A" associated with a snapshot to a key-value store 230 (also referred to as a key-value database) and a collection of snapshot data files 231 for the defined data collection A. The storage appliance 201 can also indicate in the global map 227 the snapshots represented in the key-value stores per defined data collection, as well as parent-child relationships among those snapshots. The storage appliance 201 can also store in the global map 227 the bindings of source snapshot identifier to local snapshot identifier. As previously mentioned, the local identifiers are generated. The local snapshot identifiers identify snapshots while also implicitly indicating order of the snapshots. Source snapshot identifiers (i.e., snapshot identifiers generated at the snapshot source), such as universally unique identifiers (UUIDs), are not necessarily deterministic and, thus, may not imply order of the snapshots. The binding of source snapshot identifier to local snapshot identifier allows the storage appliance to resolve the identifiers in both directions: from source snapshot identifier to local snapshot identifier to access snapshot metadata in the key-value stores and from local snapshot identifier to source snapshot identifier to communicate with the data source about the snapshots.

FIG. 2 separately depicts the different types of snapshot metadata in the key-value store 230. The storage appliance 201 could maintain a different key-value store for each different type of snapshot metadata instead of a key-value store with the different types of snapshot metadata. The storage appliance 201 arranges the snapshot metadata into file attribute metadata 233 ("inode metadata" or "inode records"), directory metadata 235 ("directory records"), and data map metadata 237 ("data map records"). All of the snapshot metadata records illustrate use of local snapshot identifiers as key prefixes. The storage appliance 201 can use a monotonically increasing counter for each new snapshot. In this example, a baseline snapshot has a local identifier of "1" and subsequent incremental snapshot has a local snapshot identifier of "2." Thus, the example data illustrates that two snapshots have been received for the defined data collection A. The storage appliance 201 constructs a key for an inode record from a local snapshot identifier and an inode number. The values for an inode record are the file attributes (e.g., author, create time, last modified time, etc.) for the inode in the corresponding snapshot. The storage appliance 201 constructs a key for a directory record from a local snapshot identifier, a parent inode number, and a child name. The child name may be a name of a file or a directory. The value in a directory record is at least an inode number corresponding to the child name. The storage appliance 201 constructs a key for a data map record from a local snapshot identifier, an inode number, and a source file offset (i.e., offset of a containing file as communicated in the snapshot). The value in a directory record is at least a length of the data block and a snapshot data file offset. The snapshot data file offset is the offset for the data block within the snapshot data file created by the storage appliance 201. A snapshot data file is an aggregation of the data for files within a corresponding snapshot.

The storage appliance 201 writes data for a snapshot into a file for the snapshot, which has been referred to as a snapshot data file. In FIG. 2, the storage appliance 201 has created a snapshot data file 239 for the snapshot 1 and a snapshot data file 241 for the snapshot 2. As depicted in the data map records 237, the offset value in the third column corresponds to the offsets within the corresponding snapshot data files. The storage appliance 201 has written the snapshot 1 data block or data range for inode 97 with source file offset 512 (key "1:97:512") and length of 88 megabits (Mb) into the snapshot data file 239 at offset 512. The storage appliance 201 has written the snapshot 1 data block for inode 98 with source file offset 0 and length of 256 Mb into the snapshot data file 239 at offset 600. Data of the inode 97 was changed in snapshot 2. More specifically, data at source file offset 100 for inode 97 was changed with data having a length of 50 Mb. For this change in snapshot 2, the storage appliance 201 has written this changed data block into the snapshot data file 241 at offset 0 as shown by the data map record with key "2:97:100."

The simple example data of FIG. 2 is sufficient to conceptually describe the snapshot data and metadata arrangement maintained at a storage appliance that operates as a cloud storage cache. Additional metadata can be maintained with the same paradigm of keys. For example, additional metadata can be maintained for access control lists and other granularities of data containers (e.g., logical unit number (LUN)). With this introduction of the snapshot data and metadata arrangement or layout, the description presents flowchart FIGS. 3-14. These figures depict example operations for creating records for a snapshot, snapshot restore, file restore, and snapshot reclamation. The Figures will refer to a snapshot manager as performing the example operations for consistency with FIG. 1. This name "snapshot manager" is a logical construct to coherently identify the functionality of a program(s) that performs the operations.

Figure 3:
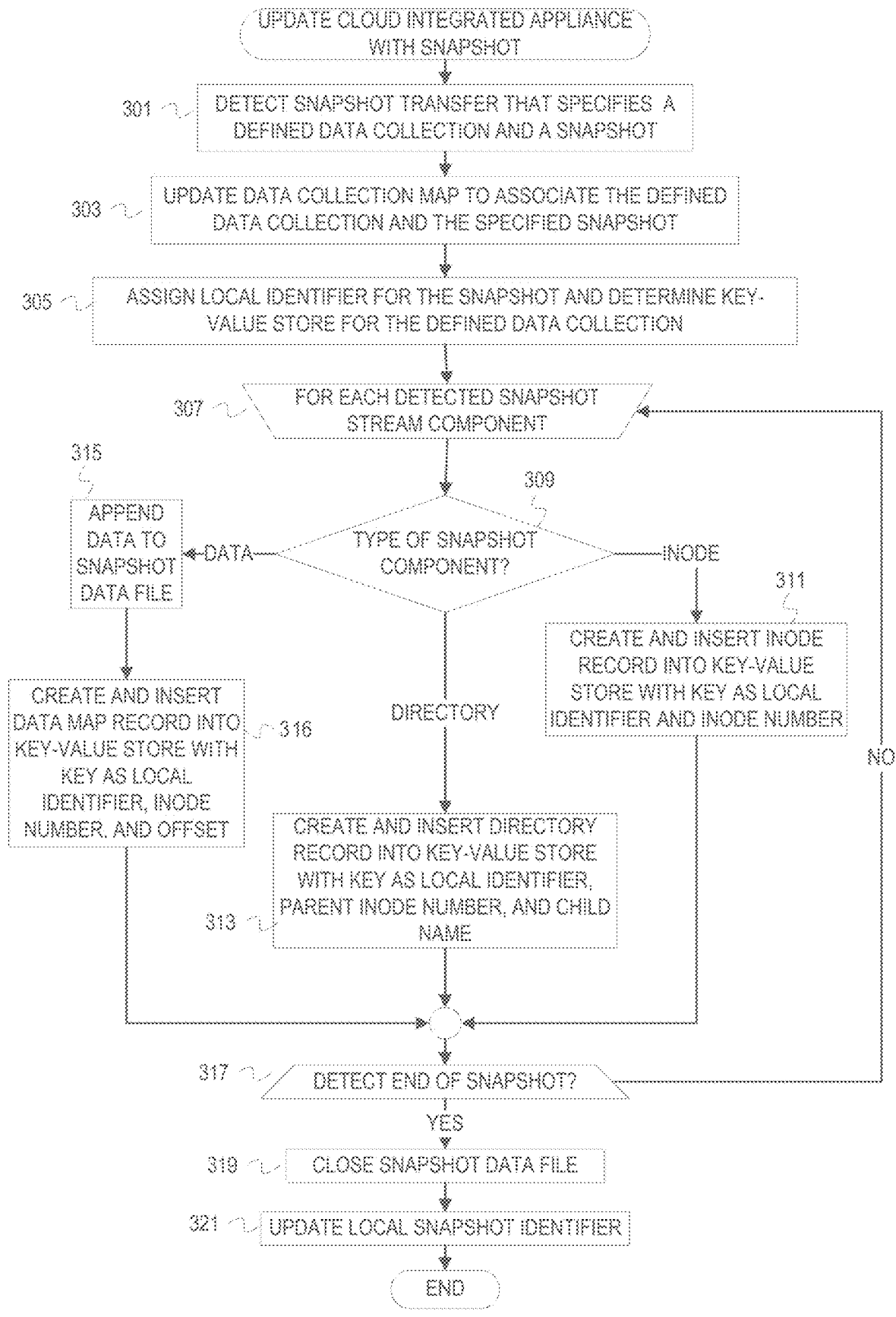
FIG. 3 is a flowchart of example operations for updating a cloud-integrated appliance with a snapshot.

FIG. 3 is a flowchart of example operations for updating a cloud-integrated appliance with a snapshot. The example operations presume receipt of "snapshot components" from a snapshot stream. A snapshot component can be a message, object, operation, etc., that indicates whether the information in a snapshot relates to data or metadata, a directory change, an inode metadata change, etc.

At block 301, a snapshot manager detects a snapshot transfer and receives information that has been extracted from a snapshot stream. The information identifies a defined data collection and a source snapshot identifier. When a new snapshot transfer is detected, the snapshot manager may perform preparatory operations for the snapshot stream. For example, the snapshot manager may create an empty snapshot data file and name the snapshot data file based on the local snapshot identifier that will be assigned to the snapshot.

At block 303, the snapshot manager updates a data collection map ("global map") to associate the defined data collection and the specified snapshot. This update can involve adding the snapshot identifier to a list of snapshot identifiers received for the defined data collection, updating a parent-child snapshot relationship, etc.

At block 305, the snapshot manager assigns a local identifier for the snapshot and determines a key-value store for the defined data collection from the global map. The snapshot manager binds the local identifier to the source snapshot identifier. This can be done in the global map or a separate structure that indicates associations between local snapshot identifiers and source snapshot identifiers.

At block 307, the snapshot manager begins processing each snapshot component from the snapshot stream. The snapshot manager can read snapshot components from a queue, receive the components via inter-process communication from a protocol stack, etc.

At block 309, the snapshot manager determines the type of snapshot component. The snapshot manager creates a record for each snapshot component depending upon the type of information conveyed. The snapshot component may include a flag or value that indicates the component type. The snapshot manager may determine the type based on content of the snapshot component. The snapshot component may be a requested operation, e.g., a request to update a directory path or file attribute. If the snapshot component indicates inode information, then control flows to block 311. If the snapshot component indicates directory information, then control flows to block 313. If the snapshot component indicates a data block, then control flows to block 315.

At block 311, the snapshot manager creates and inserts an inode record into the key-value store for the defined data collection. The snapshot manager creates the inode record with a key based on the local snapshot identifier assigned to the snapshot and an inode number indicated in the snapshot component. The snapshot manager creates the inode record with inode metadata (e.g., attributes) from the snapshot component. Control flows from block 311 to block 317.

At block 313, the snapshot manager creates and inserts a directory record into the key-value store for the defined data collection. The snapshot manager creates the directory record with a key based on the local snapshot identifier assigned to the snapshot and a parent inode number and child name from the snapshot component. The parent inode number identifies a container file system object (e.g., folder or directory). The child name may be a name of a container or a file. The snapshot manager creates the directory record with the inode number corresponding to the child name as the record value. Control flows from block 313 to block 317.

At block 315, the snapshot manager appends the data block to the snapshot data file for the snapshot. The snapshot data file was created based on detecting the snapshot stream beginning (e.g., opening a connection or session for transmission of the snapshot stream). The snapshot manager records the offset at which the data block was written into the snapshot data file At block 316, the snapshot manager creates and inserts a data map record into the key-value store for the defined data collection. The snapshot manager creates the data map record with a key based on the local snapshot identifier assigned to the snapshot, the inode number of the file that contains the data block, and a source file offset indicated in the snapshot component. The snapshot manager creates the data map record with the length of the data block and the snapshot data file offset as the value. Control flows from block 316 to block 317.

At block 317, the snapshot manager determines whether the end of the snapshot has been reached. Although the snapshot and the snapshot stream may be conceptually interchangeable, the snapshot stream includes corresponding communication infrastructure for communicating a snapshot. Thus, the snapshot manager may receive all of the data for a snapshot but the snapshot stream may still be considered active since the session has not been torn down yet. The snapshot manager may receive a communication when a snapshot ends and begins, but may not be informed when the snapshot stream (i.e., a session or connection) is interrupted or restarted. The snapshot manager may receive a termination command or close command that signifies ending of the snapshot. If the end of the snapshot has not been reached, then control flows back to block 307. Otherwise, control flows to block 319.

At block 319, the snapshot manager closes the snapshot data file. The snapshot data file can be migrated to cloud storage after it is closed.

At block 321, the snapshot manager updates the local snapshot identifier for assignment to the next received snapshot. For example, the snapshot manager increments a counter.

Figure 4:
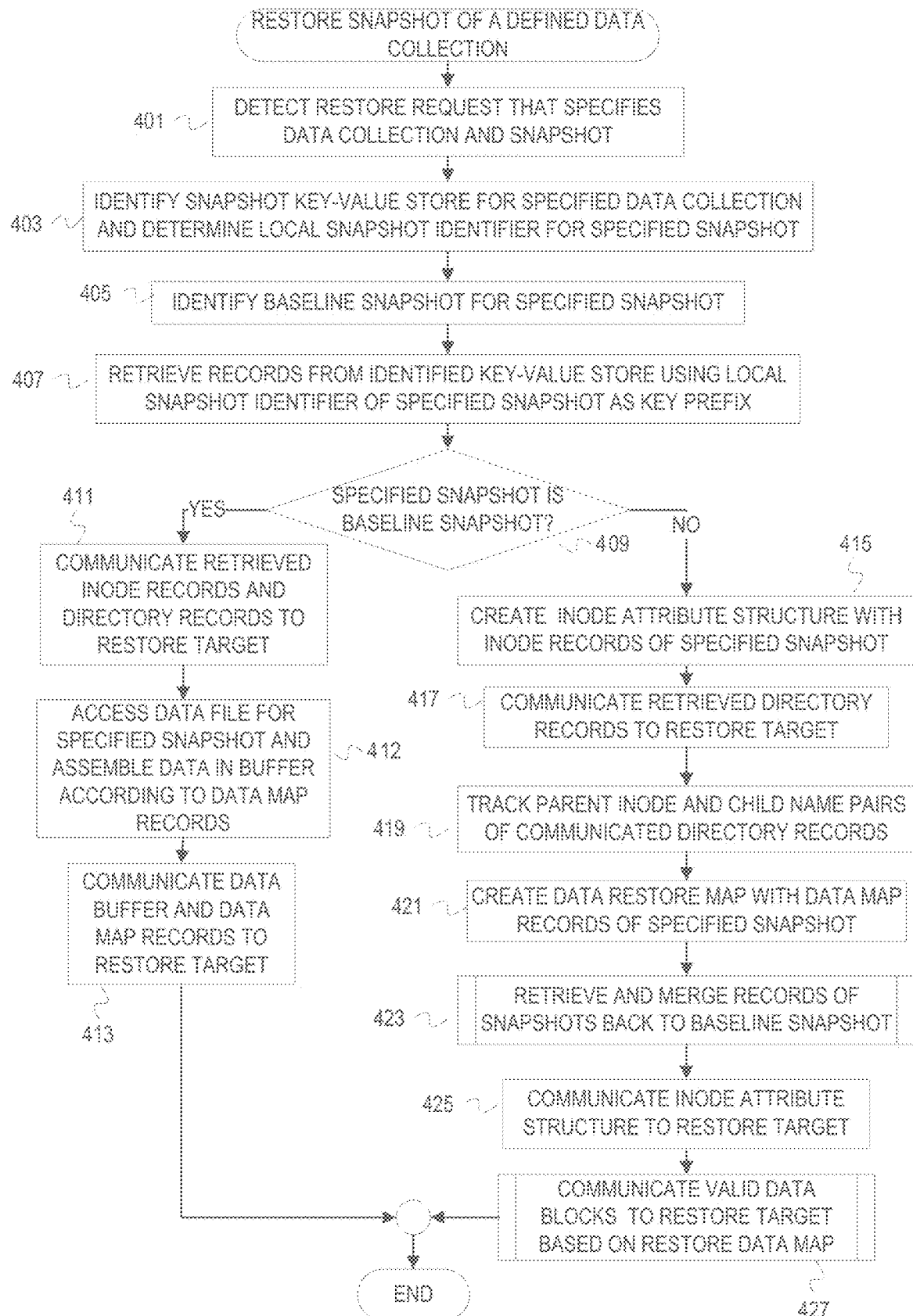
FIGS. 4-6 are flowcharts of example operations for restoring a snapshot leveraging the efficient snapshot layout.
Figure 5:
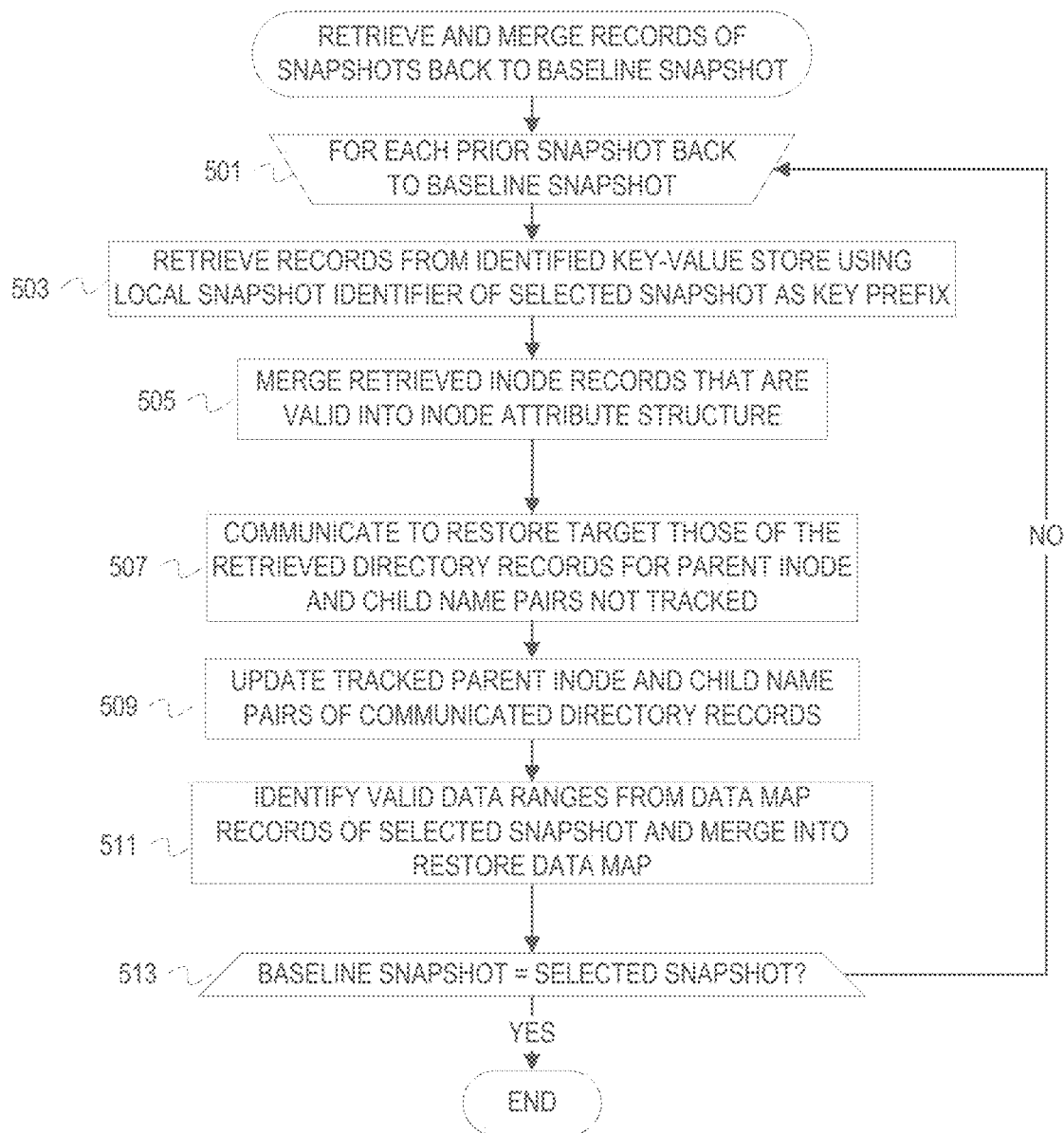
Figure 6:
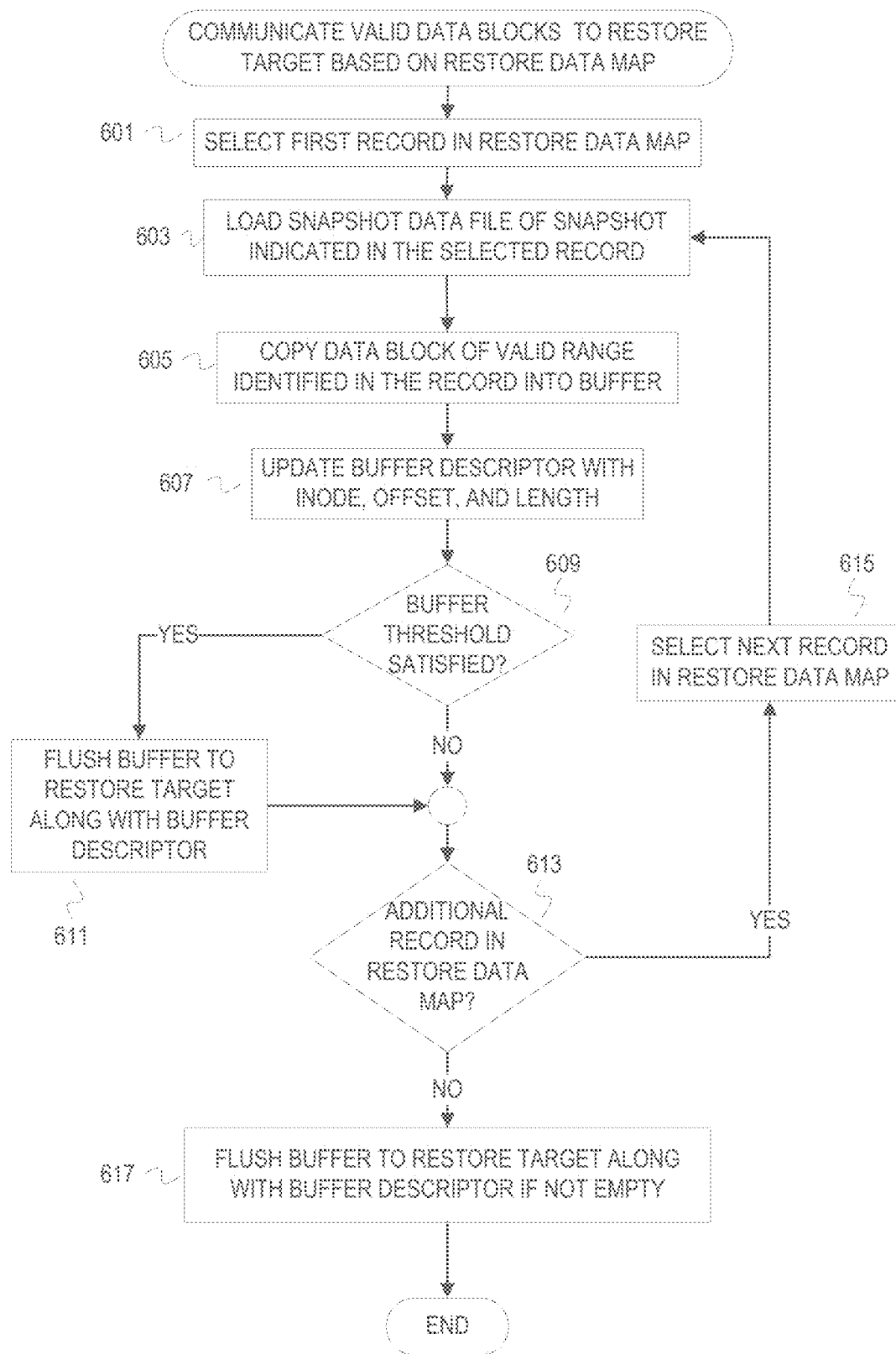

FIGS. 4-6 are flowcharts of example operations for restoring a snapshot leveraging the snapshot layout described above. FIG. 4 is a flowchart of example operations for restoring a snapshot of a defined data collection. The restore operations use the already described snapshot metadata records and snapshot data files to efficiently restore a snapshot. If a relevant snapshot data file has been evicted from a storage appliance, then the storage appliance will download the snapshot data file. Restoring a snapshot will merge valid records and data of snapshots that precede the snapshot being restored back to the baseline snapshot. The snapshot being restored controls validity.

At block 401, a snapshot manager detects a restore request that specifies a data collection and a snapshot. The snapshot manager receives a request that includes a defined data collection identifier and a source snapshot identifier. The restore request also indicates a restore target (i.e., where snapshot information should be communicated for the restore).

At block 403, the snapshot manager identifies a snapshot key-value store for the specified defined data collection and determines a local snapshot identifier for the specified snapshot. The snapshot manager accesses data collection metadata to determine a local snapshot identifier bound to the source snapshot identifier. The snapshot manager also identifies the key-value store for the defined data collection. For example, the snapshot manager resolves the data collection identifier to a reference or path to the key-value store. The key-value store may have a name based on the data collection identifier.

At block 405, the snapshot manager identifies a baseline snapshot for the specified snapshot. The snapshot manager accesses a structure that indicates parent-child relationships among snapshot for each defined data collection. The snapshot manager tracks a baseline snapshot as a parent and subsequent incremental snapshots as children of the baseline snapshot.

At block 407, the snapshot manager retrieves records from the identified key-value store using the local snapshot identifier as a key prefix. The retrieved records include inode records, directory records, and data map records. The snapshot manager retrieves all of the records into working memory (e.g., random access memory) to merge records. The snapshot manager may retrieve and merge by record type instead of retrieving all records by local snapshot identifier.

At block 409, the snapshot manager determines whether the specified snapshot is a baseline snapshot. The snapshot manager can compare the local identified of the specified snapshot with the local identifier of the baseline snapshot determined at block 405. If the specified snapshot is a baseline snapshot, then control flows to block 411. Otherwise, control flows to block 415.

At block 415, the snapshot manager creates an inode attribute structure with inode records of the specified snapshot. The inode attribute structure is a temporary data structure to host merged inode records. The snapshot manager initially creates the inode attribute structure with the inode records of the specified snapshot because the specified snapshot controls validity in case of a conflict during merging.

At block 417, the snapshot manager tracks the parent inode number and child name pairs of the retrieved directory records. The snapshot manager uses the tracked pairings to identify directory records of preceding snapshots invalidated by the specified snapshot directory records.

At block 419, the snapshot manager communicates the directory records that were retrieved to a restore target that was indicated in the restore request. The snapshot manager can determine those of the retrieved records that are directory records by examining either the key or the value. The retrieved directory records are valid since they are of the specified snapshot.

At block 421, the snapshot manager creates a restore data map with the data map records of the specified snapshot. The snapshot manager creates the restore data map with the ranges of data blocks of the specified snapshot, since these data blocks are controlling.

At block 423, the snapshot manager retrieves and merges records of snapshots back to the baseline snapshot. The snapshot manager determines which records are invalid in light of the specified snapshot record and merged records. FIG. 5 provides additional details about this example operation.

At block 425, the snapshot manager communicates the inode attributes structure to the restore target. The inode attributes structure now has information from the valid inode records that have been collected from the current snapshot back to the baseline snapshot. Directory records have already been used to help the restore target reconstruct the snapshot structure prior to receipt of the snapshot data.

At block 427, the snapshot manager communicates valid data blocks to the restore target based on the restore data map.

If the specified snapshot was determined to be the baseline snapshot at block 409, then the snapshot manager communicates retrieved inode records and directory records to the restore target at block 411. Since the specified snapshot is the baseline snapshot, merging can be avoided.

At block 412, the snapshot manager accesses a snapshot data file for the specified snapshot. The snapshot manager can use the local identifier of the specified snapshot to identify the appropriate snapshot data file. The snapshot manager also assembles the data into a buffer according to the data map records.

At block 413, the snapshot manager communicates the data buffer and information from the data map records to the restore target. The snapshot manager can communicate information about the inode number, source file offset, and data block length.

FIG. 5 is a flowchart of example operations for retrieving and merging records of snapshots back to the baseline snapshot. FIG. 5 corresponds to block 423 of FIG. 4.

At block 501, the snapshot manager begins iterating over each snapshot preceding the specified snapshot back to the baseline snapshot. The snapshot manager can use the parent-child relationship metadata to determine the preceding snapshots and the baseline snapshot. The description will refer to the currently iterated snapshot as the selected snapshot.

At block 503, the snapshot manager retrieves records from the identified key-value store using the local snapshot identifier of the selected snapshot as a key prefix. Using the local snapshot identifier of the selected snapshot as the key prefix will retrieve all of the records in the key-value store for the selected snapshot: the inode records, the directory records, and the data map records.

At block 505, the snapshot manager merges valid ones of the retrieved inode records into the inode attribute structure. The snapshot manager compares the inode numbers of the retrieved records against those in the inode attribute structure. If a match is found, then the retrieved record is discarded because the valid version of the inode record for the snapshot being restored as already been written into the inode attribute structure.

At block 507, the snapshot manager communicates to the restore target those of the retrieved directory records that indicate parent inode and child name pairs not already communicated to the restore target. The snapshot manager can compare the parent inode number and child name pairs of the retrieves records against the list tracking those pairings already communicated. If already communicated, then the valid directory record for the snapshot being restored has already been communicated.

At block 509, the snapshot manager updates the tracked parent inode number and child name pairs of directory records that have already been communicated back to restore target.

At block 511, the snapshot manager identifies valid data ranges from the data map records of the selected snapshot and merges the valid ranges into the restore data map. The snapshot manager can determine ranges for each inode represented in the data map records of the selected snapshot. The snapshot manager can then compare ranges with the offset and lengths of data map records. Data ranges already in the data map are valid and any overlapping or matching ranges from the selected snapshot data map records have been overwritten and are invalid. For a data map record that indicates a data range that is partially valid, the snapshot manager can modify the offset and length indicated in the data map record to only encompass the valid sub-range(s) of the range. The snapshot manager could also annotate a data map record that indicates a data block with a valid sub-range(s). This snapshot manager could use the annotation to guide in copying data from the snapshot data file later. A data map record that only indicates an invalid range is disregarded.

At block 513, the snapshot manager determines whether it has processed the baseline snapshot. If the snapshot manager has not yet reached the baseline snapshot, then control returns to block 501.

FIG. 6 is a flowchart of example operations for communicating valid data blocks to the restore target based on the restore data map. FIG. 6 corresponds to block 427 of FIG. 4. With the valid data ranges now defined in the restore data map created in FIG. 4 and updated in FIG. 5, the snapshot manager can return valid data blocks from the snapshot data files. Embodiments, however, may communicate all data map records back to the restore target and allow a backup application, for example, at the restore target to reassemble the data files.

At block 601, the snapshot manager selects the first record of the restore data map. The snapshot manager can create the restore data map as another key-value store that stores the keys of merged records for ordering records by snapshot and then inode. The snapshot manager can extract the information from the merged records into a different, temporary data structure. The restore data map indicates the snapshots in order from the snapshot being restored back to the baseline snapshot. In other words, the snapshot manager can iterate over each data map record that was merged into the restore data map. The snapshot indicated in a currently iterated record is referred to as the selected snapshot.

At block 603, the snapshot manager loads the snapshot data file of the selected snapshot. Loading the snapshot data file may be from local storage into memory of a storage appliance or downloading from cloud storage.

At block 605, the snapshot manager copies into a buffer a data block defined by the valid data range identified in the record. The snapshot manager determines the data ranges for each inode number in the selected snapshot data file. Since the inode numbers also influence ordering of the data map records, the snapshot manager can walk the merged records which will be in order of snapshots and inode numbers.

At block 607, the snapshot manager updates a buffer descriptor for the descriptor to indicate the inode number, the source file offset, and the data block length. The buffer descriptor guides the restore target in assembling the data blocks from the buffer into the files.

At block 609, the snapshot manager determines whether the buffer threshold is satisfied. The buffer threshold can be configured with a policy or dynamically by the snapshot manager based on available resources of the storage appliance. If the buffer threshold is satisfied, then control flows to block 611. If not, then control flows to block 613.

At block 611, the snapshot manager flushes the buffer to the restore target along with the buffer descriptor. The snapshot manager communicates the buffer contents and buffer descriptor to the restore target via a protocol stack, for example. The buffer is emptied for storing additional data blocks. Control flows to block 613 from 611.

At block 613, the snapshot manager determines whether there is an additional record in the restore data map. If there is an additional record, then control flows to block 615. At block 615, the snapshot manager selects the next record in the restore data map. Control flows from block 615 to block 603. If there is not another record in the restore data map, then control flows to block 617.

At block 617, the snapshot manager determines whether the buffer is empty. If the buffer is not empty, then the snapshot manager flushes the buffer and buffer descriptor to the restore target.

Figure 7:
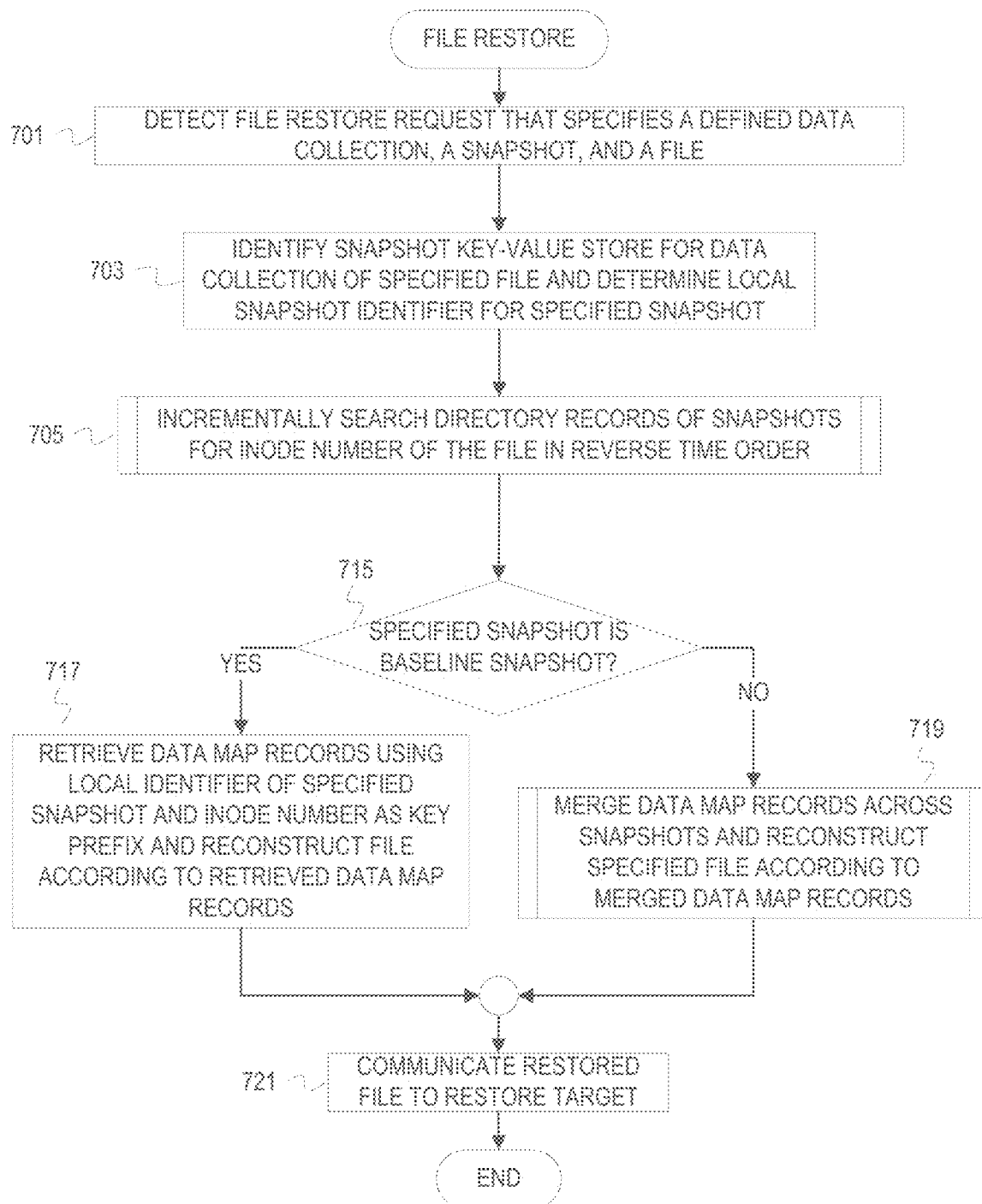
FIGS. 7-9 are flowcharts for example operations to restore a file using the efficient snapshot layout.
Figure 8:
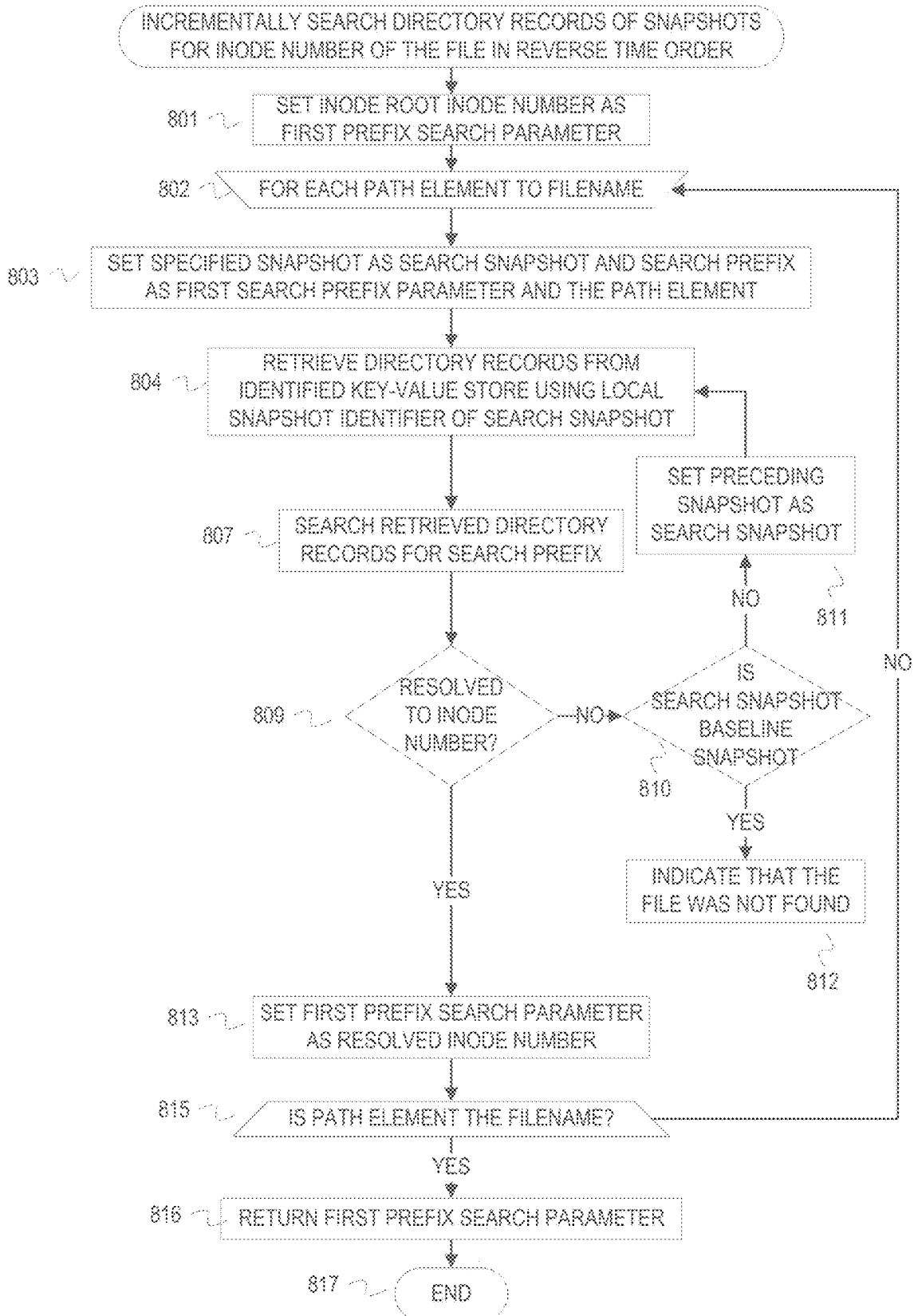
Figure 9:
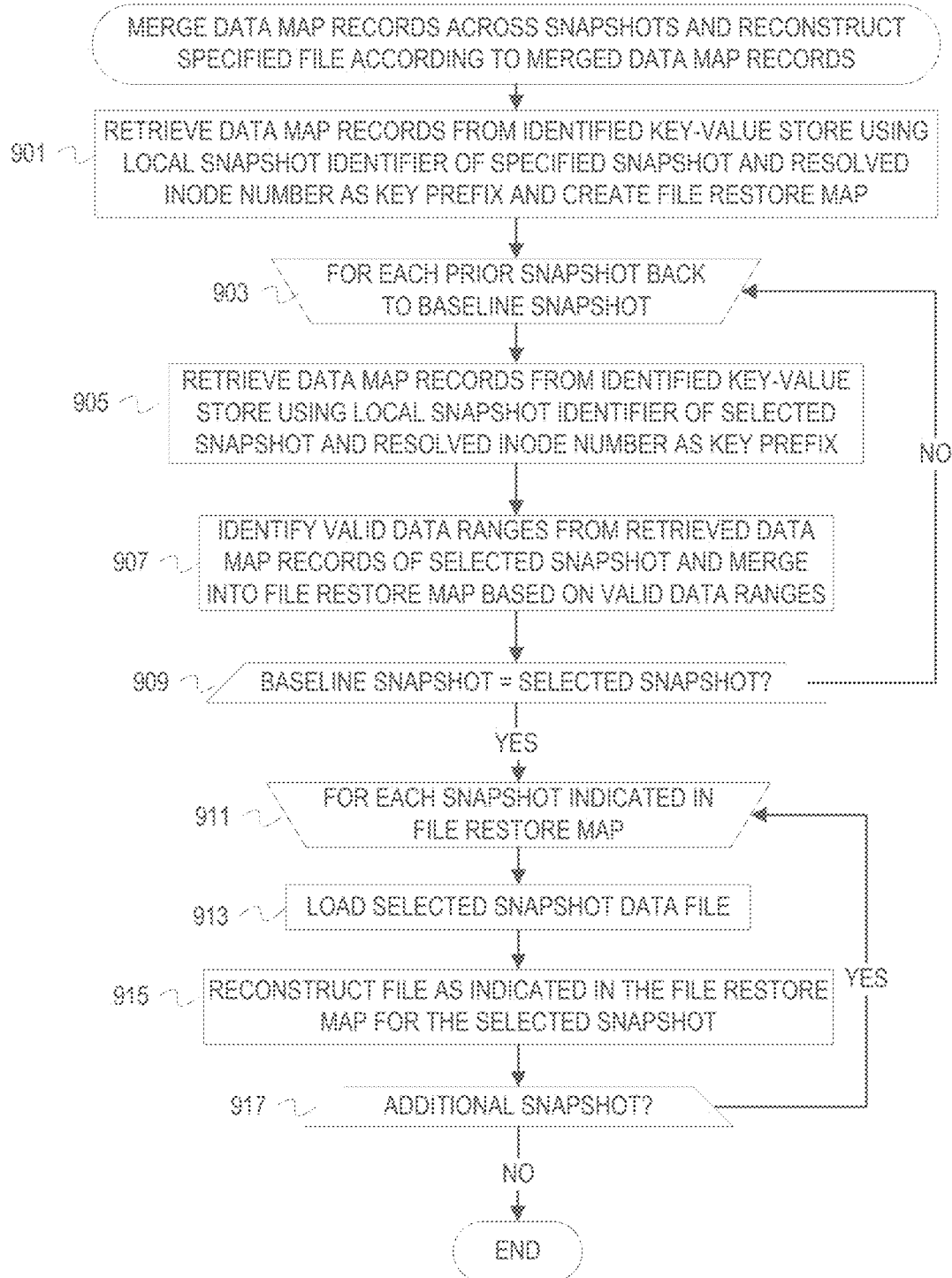

FIGS. 7-9 are flowcharts for example operations to restore a file. FIG. 7 is a flowchart of example operations for restoring a file from a specified snapshot. These example operations illustrate a different granularity of restoration that is possible. Other levels of granularity (e.g., LUN) can also be restored assuming snapshot metadata has been maintained for the specified level of granularity in the key-value store. The initial operations are similar to those for a snapshot restore. In FIG. 7, the example operations represented by blocks 701 and 703 are similar to those represented by blocks 401 and 403.

At block 701, a snapshot manager detects a restore request that specifies a defined data collection, a snapshot, and a file. The snapshot manager receives a request that includes a defined data collection identifier, a source snapshot identifier, and a file name. The restore request also indicates a restore target (i.e., where snapshot information should be communicated for the restore).

At block 703, the snapshot manager identifies a snapshot key-value store for the specified defined data collection and determines a local snapshot identifier for the specified snapshot. The snapshot manager accesses data collection metadata to determine a local snapshot identifier bound to the source snapshot identifier. The snapshot manager also identifies the key-value store for the defined data collection. For example, the snapshot manager resolves the data collection identifier to a reference or path to the key-value store. The key-value store may have a name based on the data collection identifier.

At block 705, the snapshot manager incrementally searches directory records of snapshots for the inode number of the file to be restored. The snapshot manager incrementally searches elements of the pathname (e.g., each directory or folder) of the file to be restored. The snapshot manager finds the inode number of each path element and then searches for the next element using the resolved inode number of the preceding element. For example, the snapshot begins to search the directory records for "/segment1" to eventually find the inode number for a file "/segment1/segment2/segment3/foo_file." the snapshots from the specified snapshot back through preceding snapshots.

FIG. 8 is a flowchart of example operations for this incremental search of directory records. Since the directory records are stored in a key-value store for a data collection that includes the file being restored, the snapshot manager searches directory records with a key prefix constructed from an inode number and a child name (i.e., name of the path element). After finding the child inode number (i.e., the inode number of the path element being searched for), the snapshot manager progresses to search the next path element until finding the inode number of the file to be restored.

At block 801, the snapshot manager sets the inode root number as a first prefix search parameter. The snapshot manager uses variables to construct (and reconstruct) a key prefix for searching directory records. The first prefix search parameter is the first part of the key prefix to be used for searching. The snapshot manager initially sets the first prefix search parameter to a known inode number, which is the root inode number in this example.

At block 802, the snapshot manager begins searching through the directory records of the snapshots from the specified snapshot to each preceding snapshot until finding the inode number being searched for. Initially, the snapshot manager begins the search with the specified snapshot.

At block 803, the snapshot manager sets a variable as the specified snapshot (i.e., the local snapshot identifier of the specified snapshot). The snapshot manager also sets a search prefix as the first search prefix parameter and the path element. For example, the snapshot manager sets the search prefix to be "77: dept1."

At block 804, the snapshot manager retrieves directory records from the identified key-value store using the local snapshot identifier of the search snapshot as a key prefix. Assuming a snapshot metadata arrangement that stores the various types of records in a same key-value store, the snapshot manager can use metadata of the key-value store to selectively retrieve the directory records with the key prefix and not all records with the matching key prefix (i.e., not retrieve the inode records of the search snapshot). If the snapshot manager maintains the different types of snapshot metadata in different key-value stores, then the snapshot manager can retrieve all records by the key prefix from the key-value store for directory metadata.

At block 807, the snapshot manager searches the retrieved directory records for the search prefix. The snapshot manager searches through the keys of the retrieved directory records for an entry with an inode number and child name that matches the search prefix. Control flows from block 807 to block 809.

At block 809, the snapshot manager determines whether the path element being searched resolved to an inode number. In other words, the snapshot manager determines whether a match to the search prefix was found in one of the retrieved directory records. If the inode number was found, then control flows to block 813. If the inode number was not found, then control flows to block 810.

At block 810, the snapshot manager determines whether the searched snapshot is the baseline snapshot. The snapshot manager maintains metadata that indicates which snapshots are baseline snapshots. If the searched snapshot is a baseline snapshot, then the file has not been found and the snapshot manager indicates that the file was not found at block 812. If the searched snapshot is not a baseline snapshot, then control flows to block 811.

At block 811, the snapshot manager sets the preceding snapshot as the search snapshot. For example, the snapshot manager updates a variable "search_snapshot" to be the local snapshot identifier of the snapshot that precedes the current snapshot. Control flows from block 811 back to block 804.

At block 813, the snapshot manager sets the first prefix search parameter as the resolved inode number. The snapshot manager updates the first prefix search parameter to be the resolved inode number in order to continue incrementally searching.

At block 815, the snapshot manager determines whether the path element is the name of the file to be restored. If the path element is not the filename, then the snapshot manager searches for the next path element restarting with the specified snapshot as the search snapshot. If the path element is the filename, then the snapshot manager has found the inode number of the file to be restored. That inode number has been stored in the first prefix search parameter. At block 816, the inode number is returned as the first prefix search parameter. The inode number is then used to obtain the data for restoring the file using the data map records as indicated in either of blocks 717 and 719 of FIG. 7.

At block 715, the snapshot manager determines whether the specified snapshot is the baseline snapshot. If the specified snapshot is the baseline snapshot, then the file can be restored with the baseline snapshot and control flows to block 717. Otherwise, control flows to block 719.

At block 717, the snapshot manager retrieves the data map records using the local identifier of the specified snapshot, which in this case is the local identifier of the baseline snapshot, and the inode number found in the baseline directory records as a key prefix. The snapshot manager then reconstructs the file according to the retrieved data map records. To reconstruct the file, the snapshot manager loads the baseline snapshot data file and assembles the data according to the offset and lengths indicated in the data map records. Embodiments could instead write the baseline snapshot data file to a buffer and communicate the buffer to the restore target along with a buffer descriptor that indicates the source file offsets and lengths. The restore target can reassemble the file with the buffer and buffer descriptor. Control flows from block 717 to block 721.

At block 719, the snapshot manager merges data map records across snapshots and reconstructs the specified file according to the merged data map records. The merging discards invalid data ranges and maintains valid data ranges as each preceding snapshot data map record is merged with the data map records of the specified snapshot.

At block 721, the snapshot manager communicates the restored file to the restore target.

FIG. 9 is a flowchart of example operations for merging data map records across snapshot and reconstructing a specified file according to the merged data map records. FIG. 9 corresponds to block 719 of FIG. 7.

At block 901, a snapshot manager retrieves data map records from the identified key-value store using the local snapshot identifier of the specified snapshot and the resolved inode number as a key prefix. With the retrieved data map records, the snapshot manager creates a file restore map. The file restore map is similar to the data restore map used when restoring a snapshot. The file restore map is a temporary structure to track valid data ranges as data map records of preceding snapshots are examined to determine validity of data range identified by the data map records. The file restore map is eventually used to gather data blocks for restore of the file.

At block 903, the snapshot manager begins operations for each prior snapshot back to the baseline snapshot. The snapshot manager can determine the local identifier of each prior snapshot based on the local identifier of the specified snapshot or selected snapshot. The snapshot being evaluated is referred to as the selected snapshot.

At block 905, the snapshot manager retrieves data map records from the identified key-value store using the local snapshot identifier of the specified snapshot and the resolved inode number as a key prefix. The snapshot manager will evaluate the data ranges of the retrieved data map records to determine valid ranges.

At block 907, the snapshot manager identifies a valid data range(s) from the retrieved data map records of the selected snapshot and merges the identified valid data range(s) into the file restore map based on the valid data range(s). To merge, the snapshot manager can insert a data range that has no overlap with any data range already present in the file restore map. This can be determined by comparing the source file offsets and lengths. If an overlap is detected, the snapshot manager can modify the offset and/or length of the data map record being merged to indicate only the valid range(s). If the valid data range(s) splits a data range indicated by a data map record, the snapshot manager can create an additional record in the file restore map with the additional valid range or annotate the existing data map record with a source file offset and length that defines the additional valid data range. Modification of source file offset and/or length to identify a valid data range(s) may also cause modification of a corresponding snapshot data file offset. For instance, a data block may have a source offset of 256, a length of 100, and a snapshot data file offset of 300. The snapshot manager determines that the data at offset 300 to 350 was overwritten. Thus, the data block has been split into a valid range from offset 256 to 300 and from offset 350 to 356. Within the snapshot data file, the valid data range is now from offset 300 to 344 and from offset 394 to 400. The snapshot manager will record the changes in both source file offsets and snapshot data file offsets and the change length to two different lengths of 44 Mb and 6 Mb.

At block 909, the snapshot manager determines whether the baseline snapshot has been reached (i.e., is the selected snapshot the baseline snapshot). If the baseline snapshot has been reached, then processing continues to block 911. Otherwise control returns to block 903.

At block 911, the snapshot manager begins assembling data to restore the file from each snapshot data file corresponding to each snapshot indicated in the file restore map. The snapshot manager selects a snapshot by selecting the local identifier of the selected snapshot.

At block 913, the snapshot manager loads the snapshot data file of the selected snapshot. The snapshot manager loads the file from a file system of the hosting storage appliance or download the snapshot data file from cloud storage. The snapshot manager determines location and identity of the snapshot data file with the defined data collection identifier and the local snapshot identifier. As previously mentioned, the snapshot manager may organize snapshot data files in paths corresponding to the owning defined data collection and name the snapshot data files based on the local snapshot identifier.

At block 915, the snapshot manager reconstructs the file as indicated in the file restore map. The snapshot manager can read data out from the snapshot data file into a buffer according to the snapshot data file offset and length indicated in the file restore map record for the selected snapshot and resolved inode number. If reading the data into a buffer, the snapshot manager can also update a buffer descriptor with the source file offset and data block length.

At block 917, the snapshot manager determines whether the file restore map indicates another snapshot. If not, then the merging ends. If there is another snapshot indicated in the file restore map, control returns to block 911.

Figure 10:
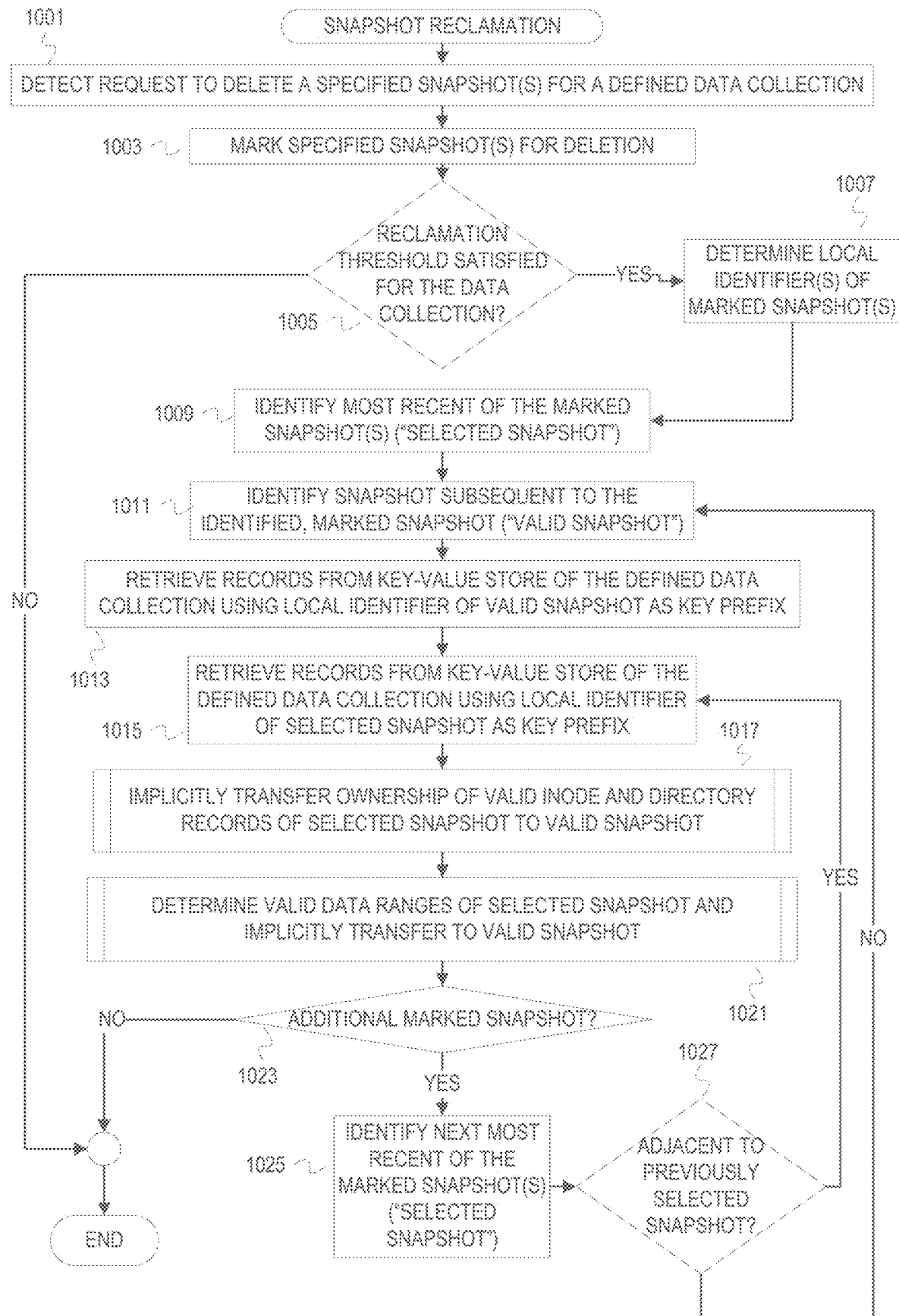
FIGS. 10-14 are flowcharts of example operations for snapshot reclamation.

In addition to restore operations, a snapshot manager allows for deletion of snapshots. When one or more snapshots are deleted, the valid snapshot metadata and snapshot data of the snapshot(s) to be deleted are merged into a succeeding snapshot. This is referred to as snapshot reclamation. FIG. 10 is a flowchart of example operations for snapshot reclamation, while FIGS. 11-14 expand upon example operations within FIG. 10.

At block 1001 of FIG. 10, a snapshot manager detects a request to delete a specified snapshot(s) for a defined data collection. The request identifies a defined data collection and one or more snapshots for deletion.

At block 1003, the snapshot manager marks the identified snapshot(s) for deletion. The snapshot manager can maintain data collection metadata that describes a defined data collection (e.g., source identifier, source name, owners, etc.). The data collection metadata can also indicate the snapshots that have been created for the defined data collection. The snapshot manager can set a flag or value in the data collection metadata that indicates deleted snapshots.

At block 1005, the snapshot manager determines whether a reclamation threshold is satisfied for the defined data collection. A threshold can be configured for all data collections or each data collection that communicates snapshots to the snapshot manager. As examples, the threshold can be a number of snapshots marked for deletion, a time period since a snapshot has been marked for deletion, and/or an amount of data corresponding to the snapshot(s) to be deleted calculated based on a running average change rate. If the threshold is not yet satisfied, the process ends.

If the threshold is satisfied, then the snapshot manager determines local identifiers of the snapshot(s) marked for deletion at block 1007. For example, the snapshot manager may read data collection metadata that binds source snapshot identifiers to local snapshot identifiers.

At block 1009, the snapshot manager identifies a most recent of the marked snapshot(s). This identified snapshot is referred to as the selected snapshot. The snapshot manager can identify the most recent as the marked snapshot with the greatest local identifier since the locally generated snapshot identifiers are deterministic.

At block 1011, the snapshot manager identifies a snapshot subsequent to the selected snapshot, i.e., a most recent adjacent snapshot not marked for deletion. This subsequent snapshot is referred to as the valid snapshot because it will take ownership of valid data from the selected snapshot.

At block 1013, the snapshot manager retrieves records from the key-value store of the defined data collection using the local identifier of the valid snapshot as a key prefix. This retrieves the various metadata records for the valid snapshot, which are used as controlling, valid snapshot metadata.

At block 1015, the snapshot manager retrieves records from the key-value store of the defined data collection using the local identifier of the selected snapshot as a key prefix. These are retrieved to allow the snapshot manager to identify valid data of the selected snapshot.

At block 1017, the snapshot manager implicitly transfers ownership of valid inode records and valid directory records to the valid snapshot. The transfer of ownership is implicit because valid inode and directory records of the "deleted" snapshot will continue to indicate the snapshot marked as deleted in their key prefixes. However, then snapshot manager will process records, for example when performing a restore, that indicate a snapshot marked as deleted as if part of a next succeeding snapshot that is not marked as deleted.

At block 1021, the snapshot manager determines valid data ranges of the selected snapshot and implicitly transfers the valid data ranges to the valid snapshot. As with the directory records and the inode records, the snapshot manager will process a snapshot data file and data map records of a snapshot marked as deleted as part of a next succeeding, valid snapshot. To reflect overwritten data, the implicit transfer of ownership of data map records and snapshot data can include the snapshot manager updating ranges and "punching holes" in the snapshot data file of snapshot to be deleted. Punching holes in a snapshot data file would involve deleting data overwritten in the valid snapshot and update the data map record(s) accordingly.

At block 1023, the snapshot manager determines whether there is an additional snapshot marked for deletion. The snapshot manager may also update state of the selected snapshot from a "to be deleted" state to a "deleted" state. Although deleted, the indications of the snapshots are not removed from the data collection metadata. If there is no additional marked snapshot, the reclamation process ends. If there is an additional marked snapshot, then control flows to block 1025.

At block 1025, the snapshot manager identifies a next most recent one of the marked snapshots. This one is now referred to as the selected snapshot.

At block 1027, the snapshot manager determines whether the selected snapshot is adjacent to the previously selected snapshot. The snapshot manager can maintain the snapshots to be deleted in a sorted queue and determine adjacency with the queue. The snapshot manager can examine the data collection metadata to determine whether the previously selected snapshot and selected snapshot are adjacent (e.g., snapshot 5 and snapshot 6 are adjacent). If the selected snapshot and previously selected snapshot are adjacent, then ownership continues being transferred to the valid snapshot. Otherwise, a new valid snapshot is identified. If the snapshots are not adjacent, then control flows back to block 1011. If the snapshots are adjacent, then control flows back to block 1015.

Figure 11:
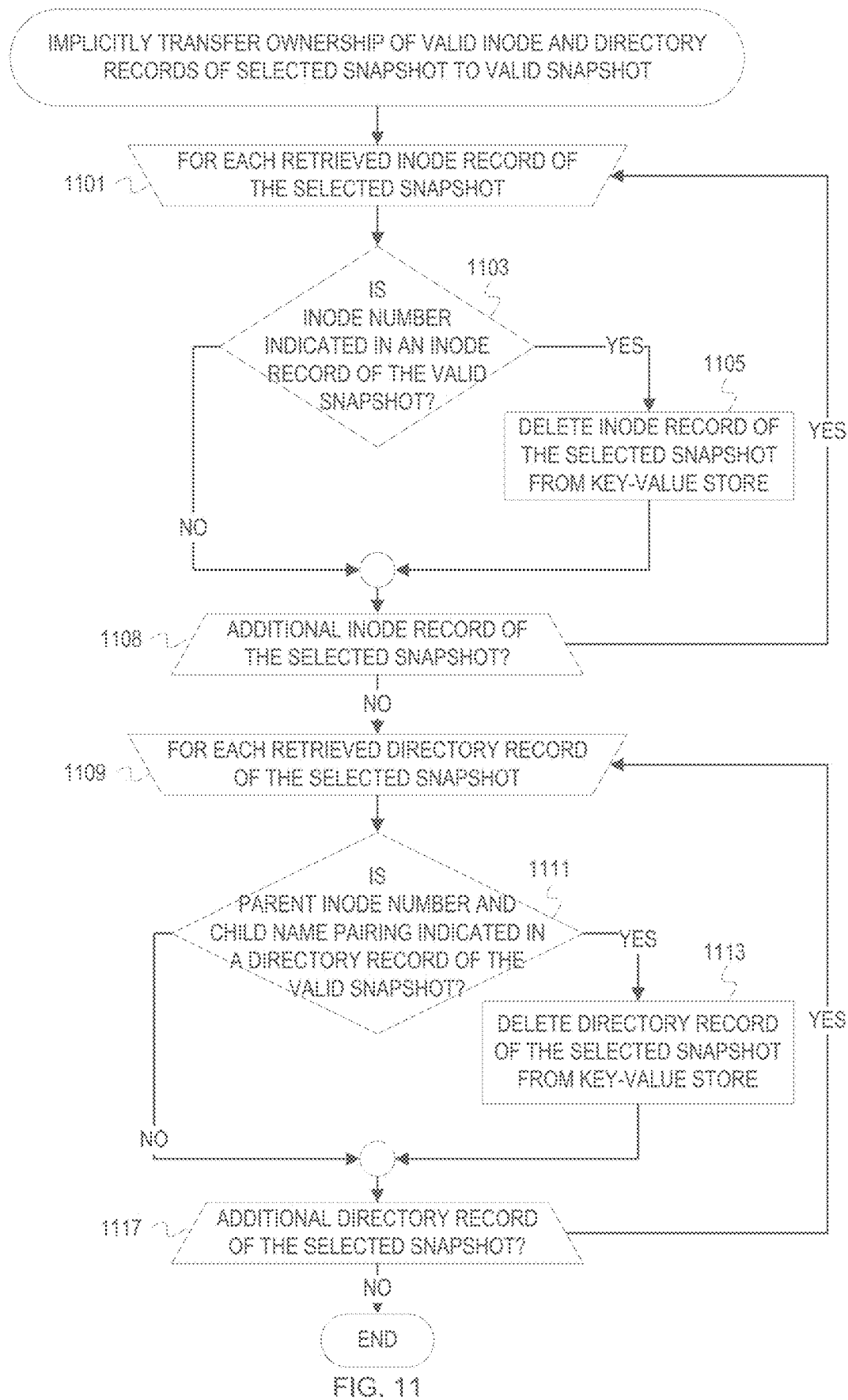

FIG. 11 is a flowchart of example operations for implicitly transferring ownership of valid inode and directory records to the valid snapshot. FIG. 11 corresponds to block 1017 of FIG. 10.

At block 1101, the snapshot manager begins iterating over each of the inode records of the selected snapshot to determine validity. The snapshot manager can walk from the first record to the last record of the retrieved inode records since they are already ordered by snapshot identifier and then inode number. The currently iterated inode record is referred to as the selected inode record.

At 1103, the snapshot manager determines whether the inode number indicated in the selected inode record is indicated in an inode record of the valid snapshot. If the inode numbers match, then the inode record of the selected snapshot is invalid. If the inode numbers match, then control flows to block 1105. Otherwise, ownership implicitly transfers to the valid snapshot. Ownership of the valid inode record implicitly transfers because ownership is presumed to be the next valid (i.e., not deleted or marked for deletion) snapshot. This avoids the overhead of updating the key prefixes of valid records.

At block 1105, the snapshot manager deletes the inode record of the selected snapshot from the key-value store of the defined data collection. This inode record is deleted because it has been changed within the valid snapshot.

At block 1108, the snapshot manager determines whether there is an additional inode record of the selected snapshot to be evaluated for ownership transfer. If there is an additional inode record, then control flows to block 1101. If not, then control continues to block 1109.

At block 1109, the snapshot manager begins iterating over each of the directory records of the selected snapshot to determine validity. The snapshot manager can walk from the first record to the last record of the retrieved directory records since they are already ordered by snapshot identifier and then parent inode number. The currently iterated directory record is referred to as the selected directory record.

At 1111, the snapshot manager determines whether the parent inode number and child name indicated in the selected directory record is indicated in a directory record of the valid snapshot. If the combination of parent inode number and child name matches, then the directory record of the selected snapshot is invalid. If a match is found, then control flows to block 1113. Otherwise, ownership of the directory record implicitly passes to the next valid snapshot as with valid inode records.

At block 1113, the snapshot manager deletes the directory record of the selected snapshot from the key-value store of the defined data collection. This directory record is deleted because it has been changed within the valid snapshot.

At block 1117, the snapshot manager determines whether there is an additional directory record of the selected snapshot to be evaluated for ownership transfer. If there is an additional directory record, then control flows to block 1109.

Figure 12:
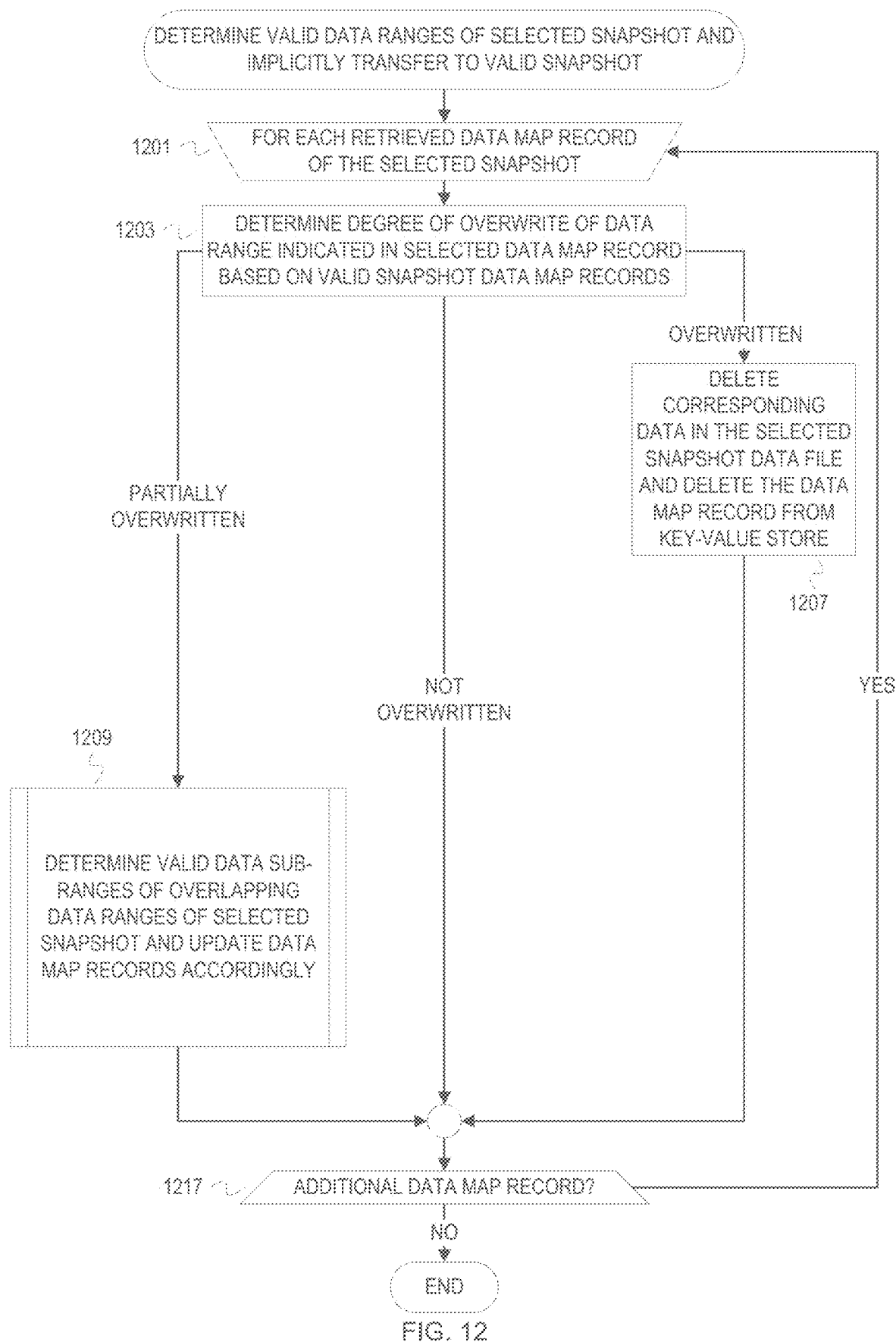

FIG. 12 is a flowchart of example operations for determining valid data ranges of a selected snapshot and implicitly transferring to a valid snapshot. FIG. 12 corresponds to block 1021 of FIG. 10.

At block 1201, the snapshot manager begins iterating over each retrieved data map record of the selected snapshot. As with the other types of records, the snapshot manager can traverse the records in order. The currently iterated data map record is referred to as the selected data map record.

At block 1203, the snapshot manager determines degree of overwrite, if any, of the data range indicated by the selected data map record by any of the data map records for the same inode in the valid snapshot data map records. To make this determination, the snapshot manager evaluates the source file offset and length of the selected data map record against the source file offsets and lengths of the data map records of the valid snapshot for the same inode number. If the data range indicated in the selected data map record was completely overwritten, then control flows to block 1207.

Since the data block has been overwritten, the snapshot manager deletes the data block from the snapshot data file of the selected snapshot at block 1207. The snapshot manager then deletes the selected data map record. Embodiments can instead mark the data block and the data map record as deleted or for deletion. Control flows from block 1207 to block 1217.

If the snapshot manager determined that the data range of the selected data map record was not overwritten, then control flows to block 1217 because the records and snapshot data file remain intact and will be presumed to be owned by the next succeeding valid snapshot as previously mentioned. This contributes to efficiency in the reclamation.

If the snapshot manager determined that the data range of the selected data map record was partially overwritten at block 1203, then control flowed to block 1209. At block 1209, the snapshot manager determines valid data sub-ranges that were not overwritten and updates the snapshot data file and data map records of the selected snapshot accordingly. Control flows from block 1209 to block 1217. At block 217, the snapshot manager determines whether there is an additional data map record of the selected snapshot.

Figure 13:
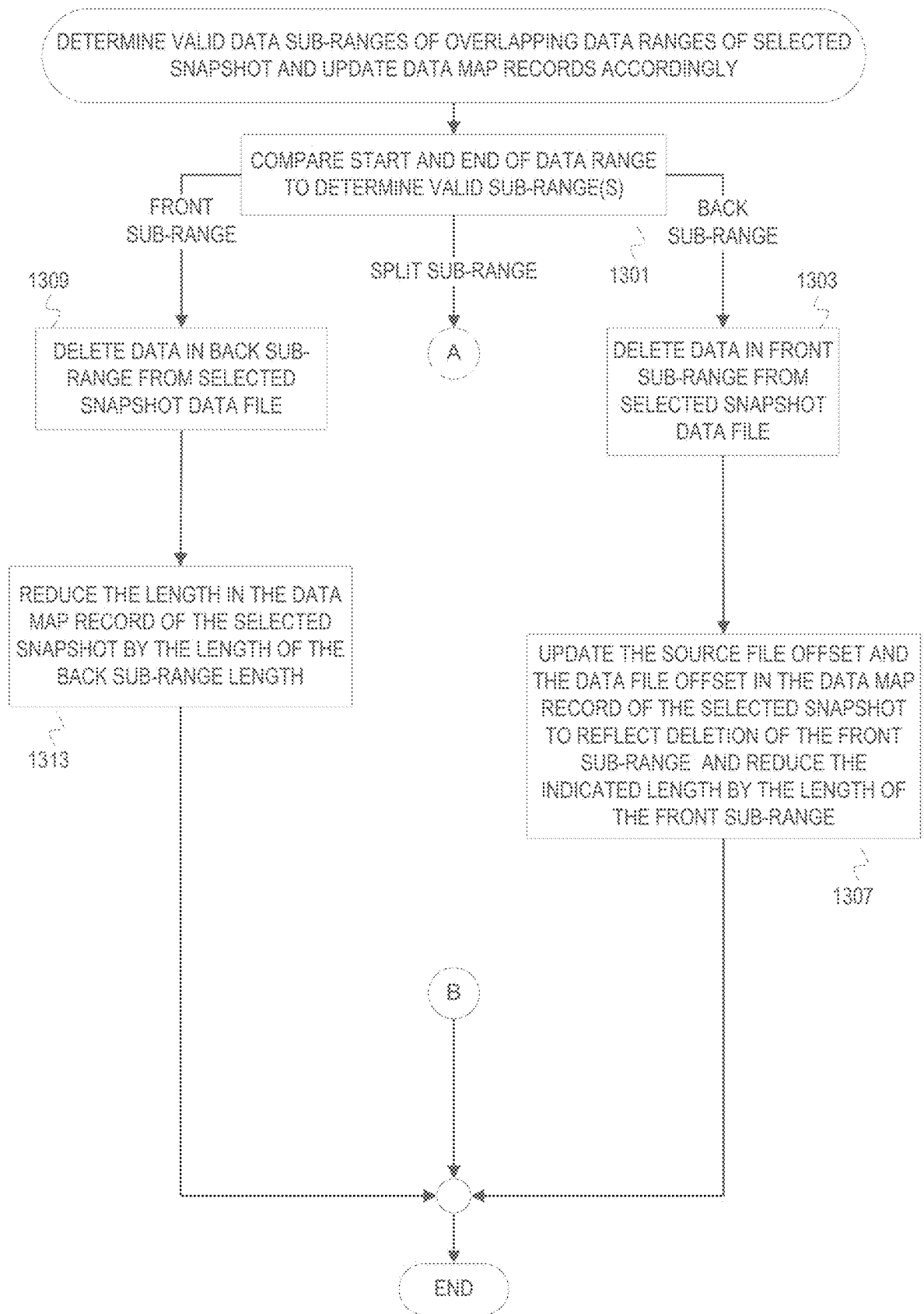
Figure 14:
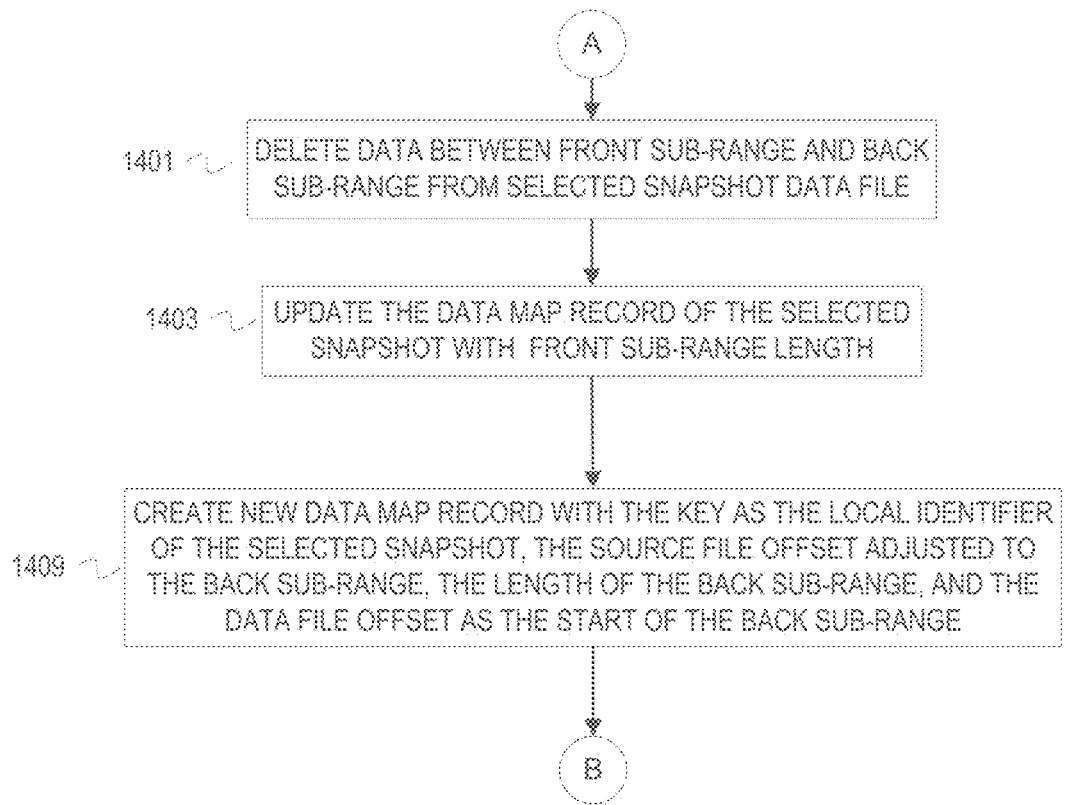

FIGS. 13-14 are flowcharts which depict example operations for determining valid data sub-ranges that were not overwritten and updating data map records of the selected snapshot accordingly. FIGS. 13-14 provide example operations that elaborate on block 1209 of FIG. 12.

At block 1301, the snapshot manager compares a start and end of a data range indicated by the selected data map record against the start and end of data ranges for the same inode indicated in the valid snapshot data map records. The start will be the source file offset and the end will be the length added to the source file offset. This determines which sub-range of the data range has not been overwritten (i.e., remains valid): a front sub-range, a back sub-range, or a split sub-range (i.e., a middle portion of the data range was overwritten). Each leads to a different update to the source data file offset and/or length for merging. If the valid sub-range is a back sub-range, then control flows to block 1303.

At block 1303, the snapshot manager deletes data in the front sub-range from the snapshot data file of the selected snapshot. The snapshot manager deletes the data from the indicated snapshot data file offset for the length of front sub-range.

At block 1307, the snapshot manager updates the data map record of the selected snapshot. The snapshot manager updates source file offset and the snapshot data file offset in the data map record to account for deletion of the front sub-range. For instance, the snapshot manager adds the length of the front sub-range to the source file offset and to the data file offset. The snapshot manager also updates the length in the data map record to be the back sub-range length.

If the valid sub-range is a front sub-range as determined at block 1301, then control flows to block 1309. At block 1309, the snapshot manager deletes data in the back sub-range from the snapshot data file of the selected snapshot. The snapshot manager deletes the data from the start of the back sub-range for the length of the back sub-range.

At block 1313, the snapshot manager updates the data map record of the selected snapshot to indicate the deletion of the back sub-range. The snapshot manager updates the length in the data map record by reducing the length indicated by the length of the back sub-range.

If the snapshot manager determined that the data range indicated by the selected data map record was split into two valid data ranges, then the snapshot manager updates the selected data map record for one of the valid ranges and inserts a new data map record for the other valid data range. At block 1401, the snapshot manager punches a hole in the snapshot data file of the snapshot data file by deleted the data between the valid sub-ranges based on the already determined lengths of the valid sub-ranges and currently indicated data file offset.

At block 1403, the snapshot manager updates the length in the data map record of the selected snapshot with the length of the front sub-range.

At block 1409, the snapshot manager creates and inserts a data map record based on the already existing data map record. The snapshot manager constructs the key for the new data map record from the local identifier of the selected snapshot, the inode number, and the source file offset as modified to account for the start of the back sub-range. To modify the source file offset, the snapshot manager adjusts the original source file offset by the length of the front sub-range and the overwritten sub-range to indicate the source file offset of the valid back sub-range. The snapshot manager also creates the data map record with the length of the back sub-range and the snapshot data file offset also adjusted according to the length of the front sub-range and the length of the overwritten sub-range. Although FIG. 14 updates the existing data map record to indicate the valid front sub-range and creates a new record for the valid back sub-range, embodiments can do the reverse.

Example Illustrations of Synthetic Baseline Snapshots to Reduce Stable Data Eviction In addition to the snapshot manager managing snapshots and creating the snapshot data and metadata according to the described layout, the snapshot manager can be used to reduce impairment of storage appliance efficiency from eviction mechanisms that use eviction policies that do not account for temporal locality in a forever incremental snapshot paradigm. As previously mentioned, the failure to account for the characteristics of a forever incremental paradigm can lead to eviction of stable data of a snapshot, which risks violating service level objectives. The described arrangement or layout of snapshot metadata facilitates efficient creation of a synthetic baseline snapshot, which is a baseline snapshot created with incremental snapshots. A storage appliance can use the synthetic baseline in tandem with refresh of eviction state data to reduce stable data eviction.

Figure 15:
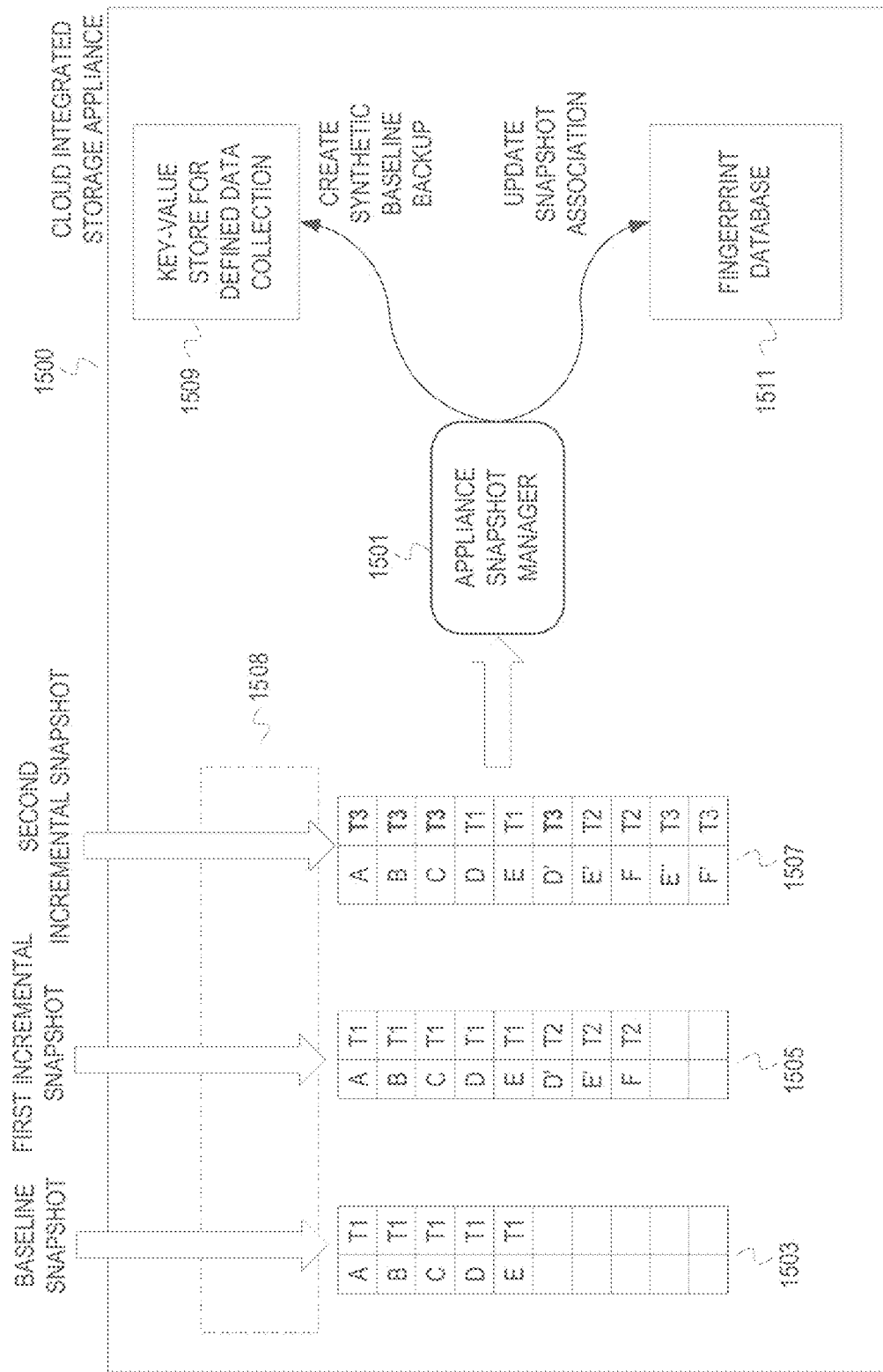
FIG. 15 is a diagram of a cloud cache snapshot manager creating a synthetic baseline as part of reducing stable data eviction.

FIG. 15 is a diagram of a cloud cache snapshot manager creating a synthetic baseline as part of reducing stable data eviction. A cloud integrated storage appliance 1500 receives forever incremental snapshots that are preceded by a baseline snapshot from a data source. The cloud integrated storage appliance 1500 is considered "cloud integrated" because it operates as a bridge and/or gateway for data being stored into cloud storage, and integrates local data management with cloud data management. The cloud integrated storage appliance 1500 caches backup data in a cache 1508. The cache 1508 is logical cache that is comprised of local storage (e.g., a disk array, flash storage array, or hybrid array)

The cloud integrated storage appliance 1500 receives a baseline snapshot and two subsequent incremental snapshots in FIG. 15. When the cloud integrated storage appliance 1500 receives the baseline snapshot, the data is stored into the cache 1508. The cloud integrated storage appliance 1500 (hereinafter "storage appliance") updates an eviction state data structure based on receipt of the baseline snapshot, which results in a first state 1503 of the eviction state data structure. The storage appliance 1500 updates the eviction state data structure with indications of the received data (identified in FIG. 15 as data blocks A-E) and corresponding eviction state data. In this example illustration, the eviction state data are time indicators and all of the received data are associated with a time indicator "T1," which represents when the data was received at the storage appliance 1500. The number of entries ("size") in the eviction state data structure can be configurable. A policy or administrator configuration can bound the size based on storage capacity of the cache 1508, which may also be configurable. The cache state data structure may not be bounded and may grow until trimmed or cleared by the eviction mechanism (e.g., reset an end pointer in contrast with a fixed size array).

When the storage appliance 1500 receives a first incremental snapshot, the storage appliance 1500 updates the eviction state data structure resulting in a second state 1505. In the second state 1505, the eviction state data structure indicates data blocks D', E', and F. Thus, the data blocks D and E have been modified since the baseline snapshot. The storage appliance 1500 associates these additional entries with the time indicator T2.

When the storage appliance 1500 receives a second incremental snapshot, the storage appliance 1500 updates the eviction state data structure resulting in a third state 1507. In the second state 1507, the eviction state data structure indicates data blocks E" and F'. This indicates that the data blocks E' and F have been modified since the second incremental snapshot. The storage appliance 1500 associates these additional entries with the time indicator T3.

Assuming a next incremental snapshot includes 3 data blocks, the stable data blocks A-C will be evicted if an eviction policy based on age (e.g., least recently used) is used. At this point in the illustration, all three of the snapshots generated to this point would use the data blocks A-C. But these data blocks would be evicted out of the storage appliance cache 1508 into cloud storage. If a restore request is received, then the restore would trigger download the data blocks A-C from cloud storage.

To avoid this eviction of stable data and facilitate an efficient restore with cached data blocks, an appliance snapshot manager 1501 creates a synthetic baseline snapshot by manipulating the snapshot metadata in a key-value store 1509 for the defined data collection corresponding to the received snapshots. The appliance snapshot manager 1501 can efficiently create the synthetic baseline snapshot by manipulating the already described layout of the snapshot metadata and avoid expensive transfers of data. The appliance snapshot manager 1501 also refreshes the time indicators associated with the data blocks that would be used by the synthetic baseline snapshot. In this example illustration, the appliance snapshot manager 1501 manipulates the snapshot metadata to use the second incremental snapshot as the basis for the synthetic baseline snapshot. Since restore of the second incremental snapshot would use data blocks A-C and D', the time indicators associated with these data blocks is set to the time indicator T3 that is associated with the second incremental snapshot.

The storage appliance 1500 is presumed to use deduplication, so the appliance snapshot manager 1501 also updates data in a fingerprint database 1511. The appliance snapshot manager 1501 updates the data in the fingerprint database 1511 to associate the second incremental snapshot with the fingerprints corresponding to the data blocks A-C and D'. The appliance snapshot manager 1501 can use the local snapshot identifier for the second incremental snapshot to associate the second incremental snapshot with the data blocks A-C and D' in the fingerprint database 1511.

The trigger for creation of the synthetic baseline snapshot and modification of eviction state data can vary. Although FIG. 15 illustrates these operations as occurring at receipt of the second incremental snapshot, some embodiments may perform these operations at other times, such as when each snapshot is received. In addition, a background process may perform these operations instead of a program identified as an appliance snapshot manager, although the background process may be a component of an appliance snapshot manager.

FIGS. 16-20 are flowcharts of example operations for different embodiments that create synthetic baseline snapshots and modify eviction state data to withstand stable data eviction. The example operations presume an arrangement of snapshot metadata and snapshot data as previously described. The figures refer to a snapshot manager performing the operations for consistency with FIG. 15.

Figure 16:
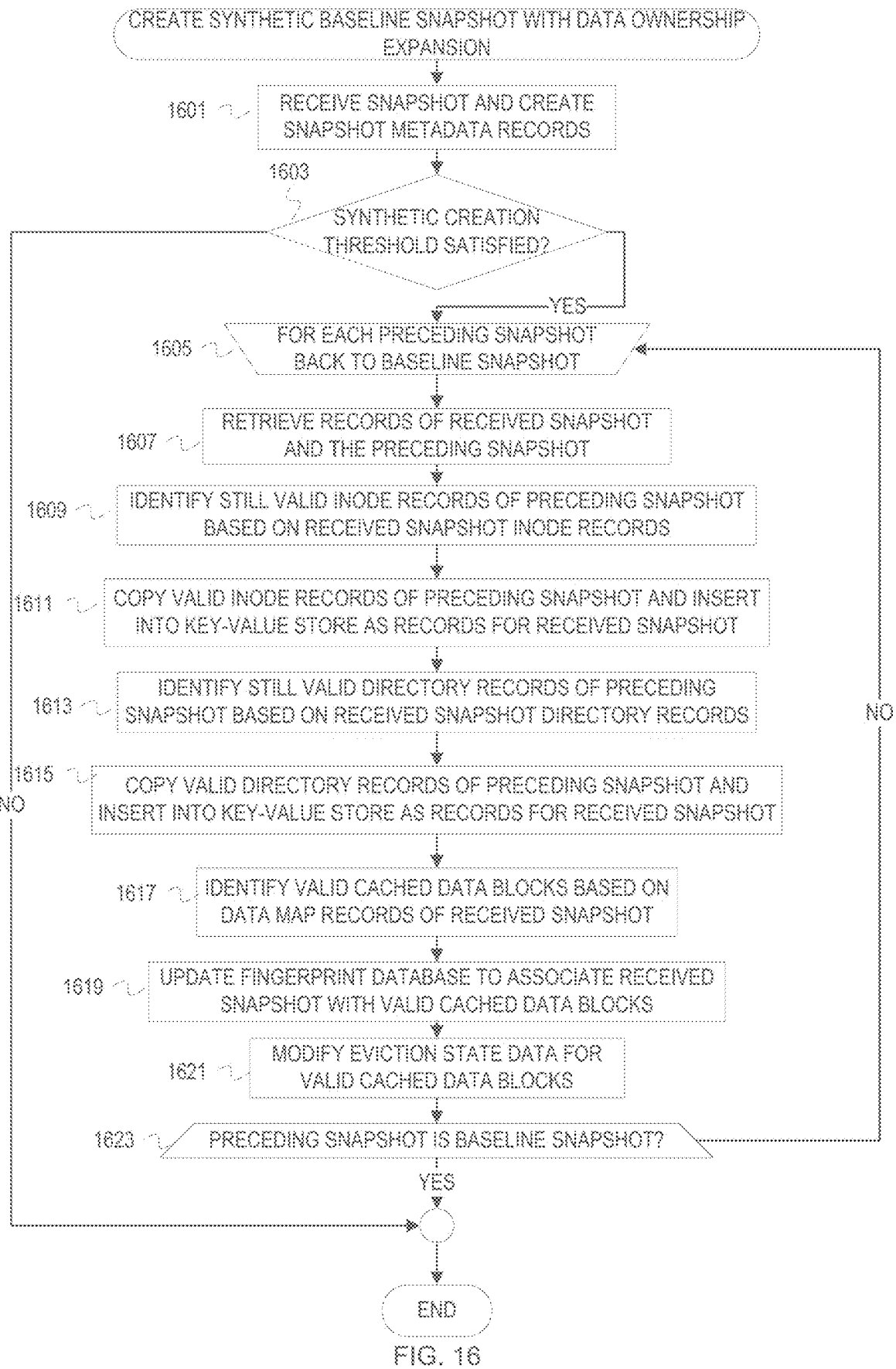
FIG. 16 is a flowchart of example operations for creating a synthetic baseline snapshot with data ownership expansion.

FIG. 16 is a flowchart of example operations for creating a synthetic baseline snapshot with data ownership expansion. The example operations expand "ownership" of valid snapshot metadata from the original owner snapshot and to a most recent snapshot. Ownership refers to an association of snapshot metadata with a snapshot identifier so that the snapshot metadata will be retrieved for any associated snapshot when requested. To expand ownership, the example operations copy still valid snapshot metadata records of preceding snapshots and indicate the local snapshot identifier of the most recent snapshot in the copied records.

At block 1601, a snapshot manager receives a snapshot and creates snapshot metadata records for the received snapshot. As described above, the snapshot manager creates inode records, directory records, and data map records.

At block 1603, the snapshot manager determines whether a threshold for creating a synthetic baseline is satisfied. A threshold can be configured that achieves a desired balance between frequency of synthetic baseline creations and managing the cache to avoid eviction of stable data. The threshold may be a number of snapshots, a size of cached data, etc. As an example, a threshold may be based on both number of snapshots and amount of cache consumed by using a snapshot change rate (i.e., average size of incremental snapshot data). With the snapshot change rate, the snapshot manager can set a threshold number of snapshots that corresponds to an expected cache consumption based on the average change rate. The threshold can also dynamically update by recalculating the snapshot change rate periodically and/or in response to detection of a trending snapshot change rate, either increasing or decreasing trend. If the threshold is not satisfied, then the process ends until a next snapshot is received. If the threshold is satisfied, then control flows to block 1605.

At block 1605, the snapshot manager begins to iterate over the snapshots that precede the received (or most recent) snapshot back to a baseline snapshot or a preceding synthetic baseline snapshot. To iterate, the snapshot manager can walk the local snapshot identifiers associated with the defined data collection corresponding to the received snapshot. As described above, the snapshot manager maintains a global mapping or data collection metadata that indicates received snapshots for each defined data collection received by the snapshot manager. When the snapshot manager creates a synthetic baseline snapshot, the snapshot manager updates the parent-child relationship metadata for the snapshots to indicate the synthetic baseline snapshot as the parent for subsequent incremental snapshots. Alternatively, the snapshot manager can mark the snapshot as a synthetic baseline snapshot and not modify parent-child relationship metadata. The snapshot manager can also maintain the parent-child relationship between incremental snapshots and the baseline snapshot and add metadata that indicates the synthetic baseline snapshot as a synthetic parent for subsequent incremental snapshots.

At block 1607, the snapshot manager retrieves the snapshot metadata records of the received snapshot and the preceding snapshot from the key-value store of the corresponding defined data collection. The snapshot manager repeats retrieval of records of the received snapshot as it iterates over the preceding snapshots to account for the increasing ownership of records by the received snapshot. Embodiments can maintain the accumulation of owned valid records and limit record retrieval from the key-value store for the received snapshot to an initial retrieval.

At block 1609, the snapshot manager identifies one or more still valid inode records of the preceding snapshot based on the received snapshot inode records. The snapshot manager compares keys of the preceding snapshot inode records and the received snapshot inode records. Those preceding snapshot records with the same inode number are invalid.

At block 1611, the snapshot manager copies the valid inode records of the preceding snapshot and inserts them into the key-value store as records for the received snapshot. The snapshot manager changes the key prefix of these copied records to the local snapshot identifier of the received snapshot. The "copying" can be performed by modifying the already retrieved, valid inode records of the preceding snapshot to indicate the received snapshot local identifier as the key prefix and inserting these into the key-value store.

At block 1613, the snapshot manager identifies one or more still valid directory records of the preceding snapshot based on the received snapshot directory records. The snapshot manager compares keys of the preceding snapshot directory records and the received snapshot directory records. Those preceding snapshot records with the same parent inode number and child name are invalid.

At block 1615, the snapshot manager copies the valid directory records of the preceding snapshot and inserts them into the key-value store as records for the received snapshot. The snapshot manager changes the key prefix of these copied records to the local snapshot identifier of the received snapshot. The "copying" can be performed by modifying the already retrieved, valid directory records of the preceding snapshot to indicate the received snapshot local identifier as the key prefix and inserting these into the key-value store.

At block 1617, the snapshot manager identifies valid cached data blocks based on data map records of the received snapshot. As described above, the snapshot manager can compare data ranges indicated in the data map records to determine data blocks that have been overwritten. Since the snapshot manager is manipulating data for purposes related to cache eviction, the snapshot manager limits this determination of validity to cached data blocks. The snapshot manager can evaluate the block descriptors in the fingerprint database to determine the appropriate inode numbers to selectively evaluate the data map records. The snapshot manager does not identify valid cached data blocks to expand ownership of the data map records but, rather, to associate received snapshots with the cached data blocks.

At block 1619, the snapshot manager updates the fingerprint database to associate the received snapshot with valid cached data blocks. The fingerprint database metadata will identify inode numbers and/or file block numbers that reference the cached data blocks. The fingerprint database metadata can also indicate snapshots. The pairing of inode number and snapshot identifier can uniquely identify an instance of a referencing file. If a storage appliance does not implement deduplication, the storage appliance can maintain a data structure with descriptors for cached data blocks and indicate associated local snapshot identifiers and file information (e.g., inode numbers, file block numbers, etc.).

At block 1621, the snapshot manager modifies eviction state data for valid cached data blocks. The snapshot manager modifies the eviction state data associated with the valid cached data blocks to reduce the chances of being evicted. The snapshot manager can modify the eviction state data of the data blocks to indicate a time indicator (e.g., time stamp, time period identifier, etc.) associated with the received snapshot. If the eviction policy is based on use frequency (e.g., least frequently used), the snapshot manager can increment the use counter. The snapshot manager may update multiple fields of eviction state data for an eviction policy that has multiple factors, e.g., age and use frequency.

At block 1623, the snapshot manager determines whether the preceding snapshot is the baseline snapshot. If not, there are additional preceding incremental snapshots to process and control returns to block 1605. If the baseline snapshot has been reached, then the process ends until the next snapshot is received.

FIGS. 17-20 depict a flowchart of example operations for creating a reverse incremental based synthetic baseline snapshot to reduce stable data eviction. Instead of expanding ownership of snapshot metadata, a reverse incremental synthetic baseline snapshot is maintained. In contrast to the example operations of FIG. 16, snapshot data is transferred between snapshots to the most recent snapshot to continually "refresh" the synthetic baseline snapshot with the most recent snapshot.

Figure 17:
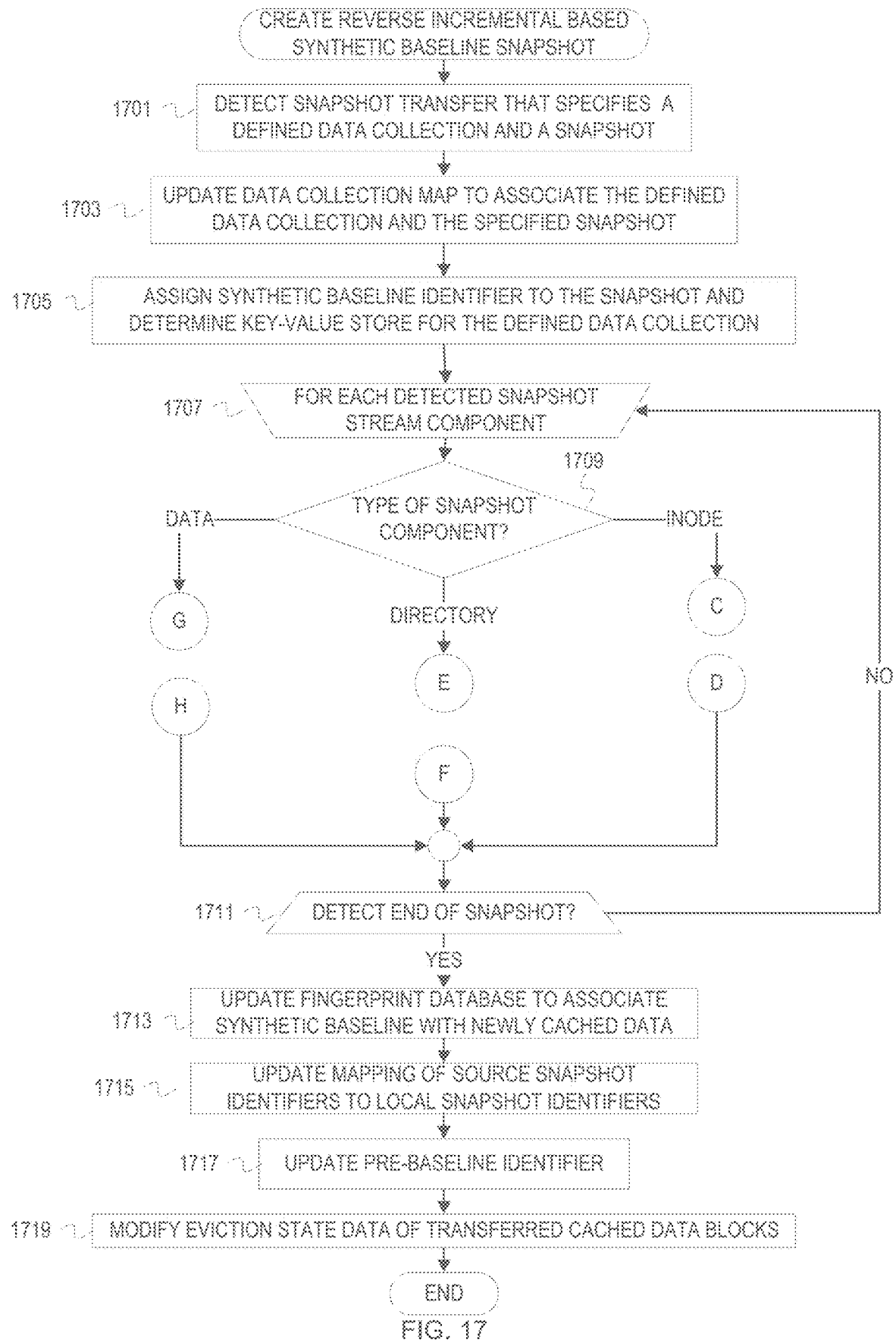
FIGS. 17-20 depict a flowchart of example operations for creating a reverse incremental based synthetic baseline snapshot to reduce stable data eviction.

At block 1701 of FIG. 17, a snapshot manager detects a snapshot transfer that specifies a defined data collection and a snapshot. Another process, such as a process of a communication protocol stack, communicates information to the snapshot manager that a snapshot for a data collection is being transferred, for example in a stream, to the storage appliance that hosts the snapshot manager. The snapshot transfer information corresponds to an initial exchange between the hosting storage appliance and a data source. This information at last identifies the defined data collection and the snapshot with a snapshot identifier recognized by the data source (e.g., UUID).

At block 1703, the snapshot manager updates a data collection map to associate the defined data collection and the specified snapshot. The snapshot manager can update data collection metadata, as previously described, that indicates snapshots received per defined data collection.

At block 1705, the snapshot manager assigns a synthetic baseline snapshot identifier to the snapshot and determines a key-value store for the defined data collection. The snapshot manager can reserve a value for the synthetic baseline identifier or use a predefined value for the synthetic baseline identifier. For example, the snapshot manager can use a maximum unsigned integer as the synthetic baseline snapshot identifier if local snapshot identifiers are unsigned integers. This can avoid a deterministic local snapshot identifier from incrementing to collide with the synthetic baseline snapshot identifier.

At block 1707, the snapshot manager begins processing each detected snapshot component. These "components" can take different forms depending on how the data source communicates a snapshot via stream. As examples, a component can be a request (e.g., request to perform a directory operation), message, object, etc. As described earlier, the component can indicate different types of snapshot metadata or snapshot data.

At block 1709, the snapshot manager determines the type of snapshot component. The snapshot manager can determine the type of snapshot component by reading a flag or value in a body or header of the component. If the snapshot stream component indicates snapshot data (e.g., a data block(s) and block descriptor), then control flows to block 2001 as indicated by the letter G. If the snapshot stream component indicates directory metadata, then control flows to block 1901. If the snapshot component indicates inode metadata, then control flows to block 1801.

Figure 18:
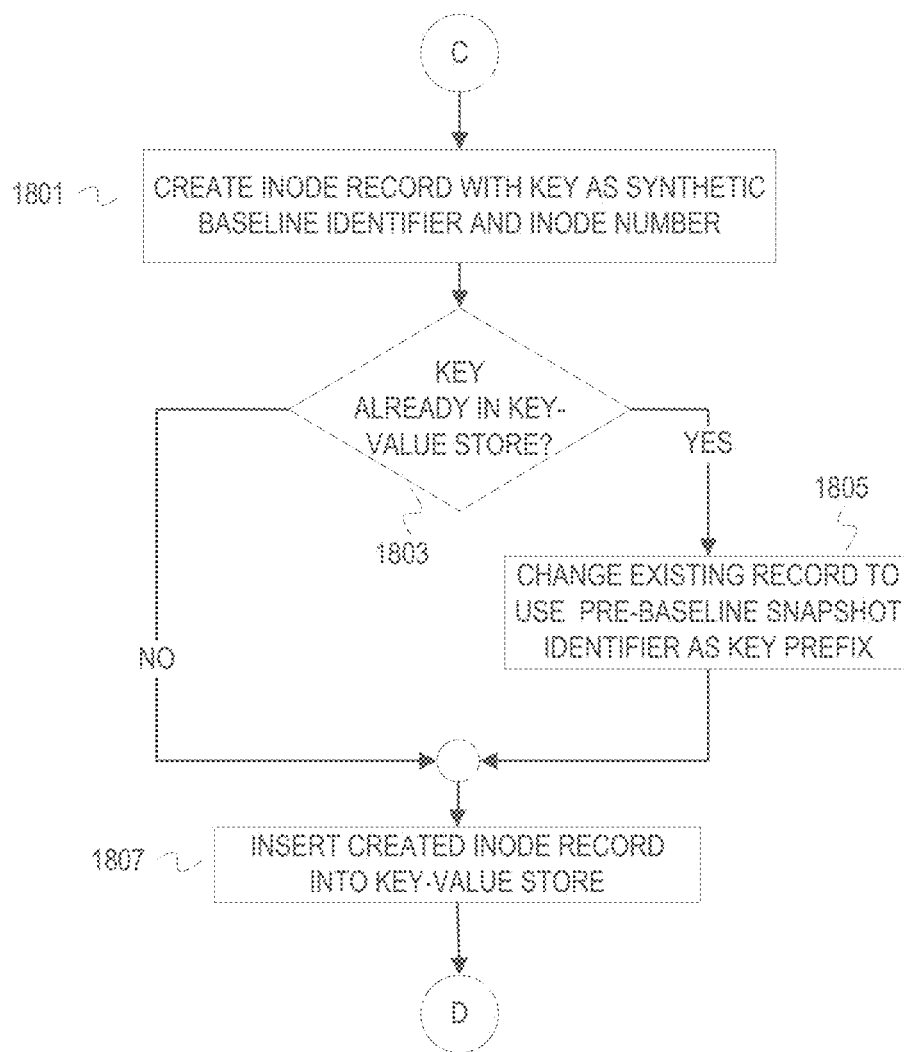

At block 1801 of FIG. 18, the snapshot manager creates an inode record in the previously determined key-value store with a key based on the synthetic baseline snapshot identifier and the inode number indicated in the snapshot stream component. Creation of the inode record can involve creating a data structure that conforms to the design of the key-value store and populating value fields of the inode record with information in the snapshot stream component (e.g., file attributes).

At block 1803, the snapshot manager determines whether the key is already present in the key-value store. The snapshot manager can submit a record retrieval with the created key. If a record is returned, then the corresponding inode record is no longer valid for the snapshot being received. If no record is returned, then control flows to block 1807. If a record is returned, then control flows to block 1805.

At block 1805, the snapshot manager changes the inode record that already exists in the key-value store to use a pre-baseline snapshot identifier as the key prefix. The pre-baseline snapshot identifier comprises a local snapshot identifier that identifies the snapshot that precedes the currently received snapshot. The snapshot manager can initialize the pre-baseline snapshot identifier to be a value representing a first received snapshot for a data collection (e.g., 0 or 1) and increment the value after being used. Embodiments can also wait to increment the pre-baseline identifier until a new snapshot is received. The snapshot manager can change the existing record by submitting an update or change request that conforms to the semantics of the key-value store. Effectively, the snapshot manager is effectively creating a pre-baseline snapshot as it is refreshing the synthetic baseline snapshot. Control flows to block 1807.

At block 1807, the snapshot manager inserts the created inode record into the key-value store. The created inode record includes the inode metadata of the snapshot being received and the synthetic baseline identifier as the key-prefix. Control flows to block 1711 of FIG. 17.

Figure 19:
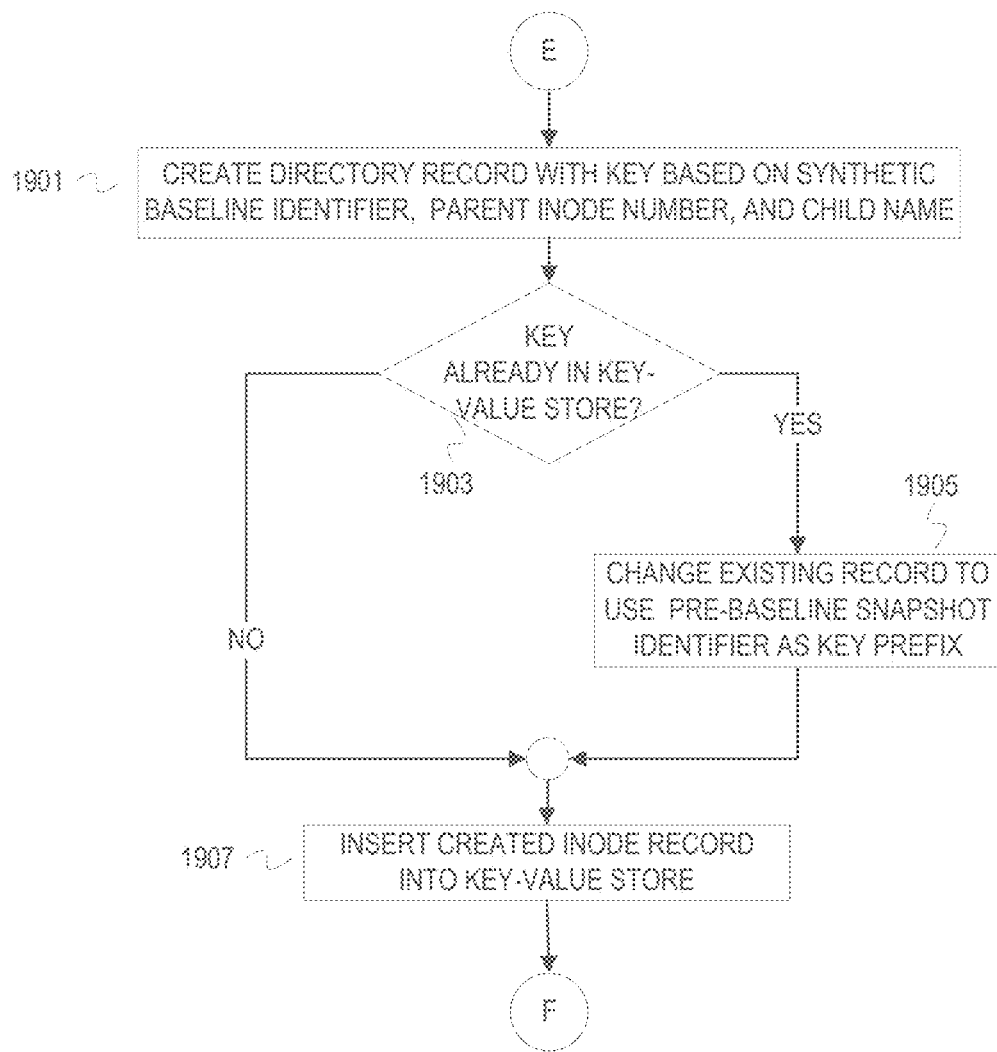

If the snapshot manager determines at block 1709 that the snapshot component indicates directory metadata, then control flows to block 1901 of FIG. 19. Processing of directory metadata in FIG. 19 is similar to processing inode metadata in FIG. 18. At block 1901 of FIG. 19, the snapshot manager creates a directory record in the previously determined key-value store with a key based on the synthetic baseline snapshot identifier, a parent inode number indicated in the snapshot stream component, and a child name indicated in the snapshot stream component. Creation of the directory record can involve creating a data structure that conforms to the design of the key-value store and populating value fields of the directory record with information in the snapshot stream component (e.g., inode number corresponding to the child name, ownership information, access permissions, etc.).

At block 1903, the snapshot manager determines whether the key is already present in the key-value store. The snapshot manager can submit a record retrieval with the created key. If a record is returned, then the corresponding directory record is no longer valid for the snapshot being received. If no record is returned, then control flows to block 1907. If a record is returned, then control flows to block 1905. If a key-value store provides for an operation to indicate whether a key exists in the key-value store without returning the corresponding record, then the snapshot manager can use that operation instead of record retrieval to determine whether the created record, whether inode or directory, invalidates a counterpart record in the key-value store.

At block 1905, the snapshot manager changes the directory record that already exists in the key-value store to use the pre-baseline snapshot identifier as the key prefix. Control flows to block 1907.

At block 1907, the snapshot manager inserts the created inode record into the key-value store. The created inode record includes the directory metadata of the snapshot being received and the synthetic baseline identifier as the key-prefix. Control flows to block 1711 of FIG. 17.

Figure 20:
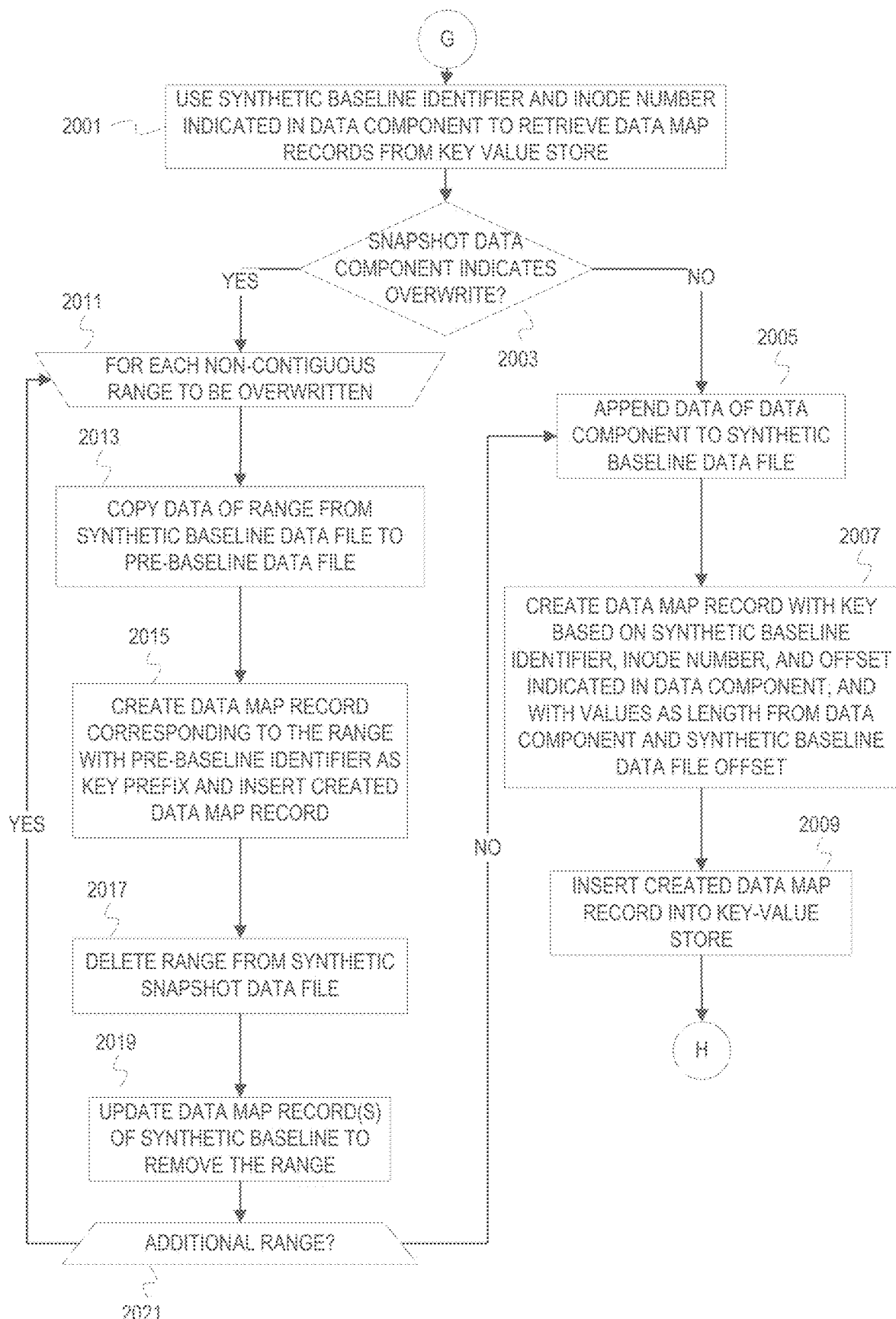

If the snapshot manager determines at block 1709 that the snapshot component indicates snapshot data (e.g., data blocks and block descriptors), then control flows to block 2001 of FIG. 20. Since the synthetic baseline snapshot persists across snapshots, the snapshot manager can maintain a corresponding snapshot data file. This synthetic baseline snapshot data file changes with each received snapshot. The snapshot manager creates and closes the pre-baseline snapshot data files created from the update of the synthetic baseline snapshot. Accordingly, the snapshot manager transfers invalidated snapshot metadata and snapshot data to the pre-baseline snapshot and incorporates the new/changed data of the snapshot being received.

At block 2001, the snapshot manager uses the synthetic baseline snapshot identifier and inode number indicated in the snapshot data component to retrieve data map records from the key-value store. In other words, the snapshot manager retrieves those of the data map records currently owned by the synthetic baseline snapshot that correspond to the inode number(s) indicated in the data component.

At block 2003, the snapshot manager determines whether the received snapshot data indicates overwrite/change of any data block(s) that is currently owned by the synthetic baseline snapshot. To make this determination, the snapshot manager evaluates the source file offset and length of the received snapshot data against the source file offsets and lengths of the retrieved data map records. If an overwrite/change has occurred, then control flows to block 2011. Otherwise, control flows to block 2005.

At block 2005, the snapshot manager appends the data in the snapshot data component to the synthetic baseline snapshot data file. The snapshot manager records the offset at which the data was appended for writing into a corresponding data map record.

At block 2007, the snapshot manager creates a data map record that indicates a key based on the synthetic baseline identifier, an inode number indicated in the snapshot data component, and a source file offset indicated in the snapshot data component. The snapshot manager also creates the data map record with value fields populated with the length indicated in the snapshot data component and the recorded synthetic baseline snapshot data file offset at which the data was appended. At block 2009, the snapshot manager inserts the created data map record. Control flows from block 2009 to block 1711 of FIG. 17.

If the snapshot manager determines that an overwrite/change occurred at block 2003, then control flows to block 2011. At block 2011, the snapshot manager begins to transfer each non-contiguous data range that is overwritten/changed to the pre-baseline snapshot. The snapshot manager can determine the non-contiguous range(s) of data to be transferred to the pre-baseline snapshot by comparing the source file offsets and lengths. Each non-contiguous range is referred to below for FIG. 20 as the range.

At block 2013, the snapshot manager copies data of the range from the synthetic baseline snapshot data file to a pre-baseline snapshot data file. If this is the first snapshot data component for the snapshot being received, then the snapshot manager can create or request creation of a snapshot data file with an identifier based on the pre-baseline snapshot identifier (e.g., file name that incorporates the pre-baseline snapshot identifier). The copying to the pre-baseline snapshot data file can conform to the previously described append paradigm.

At block 2015, the snapshot manager creates a data map record corresponding to the range with the pre-baseline identifier as the key prefix. The snapshot manager creates a data map record for the pre-baseline snapshot that uses the inode number, the source file offset, and the length from the synthetic baseline snapshot data map record. The snapshot manager indicates the offset at which the data was appended into the pre-baseline snapshot data file.

At block 2017, the snapshot manager deletes the data of the range from the synthetic baseline snapshot data file. For example, the snapshot manager can write null values, all zeroes, all ones, into the range of the synthetic baseline snapshot data file. The snapshot manager can mark or track ranges that are deleted instead of deleting the range or before deleting the range.

At block 2019, the snapshot manager updates the data map record(s) of the synthetic baseline snapshot to remove the range. As described earlier, an overwrite may be partial. If a partial overwrite is detected, then the snapshot manager updates source file offsets and lengths depending upon whether the data range that remains valid for the currently received snapshot is a front range, back range, or both (i.e., a data range was split).

At block 2021, the snapshot manager determines whether there is an additional non-contiguous range that is overwritten. If not, control continues to block 2005. Otherwise, the snapshot manager proceeds to the next non-contiguous range to process at block 2011.

After the snapshot metadata and snapshot data updates described in FIGS. 18-20, the flow returns to FIG. 17. At block 1711, the snapshot manager determines whether the end of the snapshot is detected. The snapshot manager may receive a communication when a snapshot ends and begins, but may not be informed when a session or connection is interrupted or restarted. The snapshot manager may receive a termination command or close command that signifies ending of the snapshot. If the end of the snapshot has not been reached, then control flows back to block 1707. Otherwise, control flows to block 1713.

At block 1713, the snapshot manager updates the fingerprint database, assuming deduplication is implemented, to associate the synthetic baseline snapshot identifier with the newly cached data. Data received for the received snapshot is updated in metadata that tracks the cached data and is updated to indicate an association with the synthetic baseline snapshot.

At block 1715, the snapshot manager updates a mapping of source snapshot identifiers to local snapshot identifiers. The snapshot manager associates the source snapshot identifier of the currently received snapshot with the synthetic baseline snapshot identifier. The snapshot manager changes the mapping of the previously received snapshot to be associated with the pre-baseline snapshot identifier.

At block 1717, the snapshot manager updates the pre-baseline snapshot identifier. For example, the snapshot manager increments the pre-baseline snapshot identifier.

At block 1719, the snapshot manager modifies eviction state data for transferred cached data blocks. The snapshot manager modifies the eviction state data associated with the valid cached data blocks to reduce the chances of being evicted. The snapshot manager can modify the eviction state data to indicate a time indicator (e.g., time stamp, time period identifier, etc.) associated with the received snapshot. If the eviction policy is based on use frequency (e.g., least frequently used), the snapshot manager can increment the use counter. The snapshot manager may update multiple fields of eviction state data for an eviction policy that has multiple factors, e.g., age and use frequency. Embodiments can use the local snapshot identifiers as eviction state data. Since the local snapshot identifiers correspond to order of receipt of the snapshots, the eviction mechanism can evict data blocks associated with local snapshot identifiers that suggest earliest receipt. Data used by the synthetic baseline snapshot will maintain an association with the synthetic baseline snapshot identifier, which represents to the eviction mechanism that it is most frequently used or most recently used, depending upon the caching algorithm being used.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For instance, FIGS. 4-6 present example operations that restore a specified snapshot. Embodiments, however, can service multiple requests to concurrently restore snapshots of different data collections. For example, the operations can perform operations to spawn different threads for different data collections and track progress of restores by data collection thread. As another example variant, the operations of FIGS. 4-6 can communicate valid data blocks as identified to a restore target instead of communicating valid data blocks after they have been identified for a snapshot. For instance, the operations to write valid data blocks into a buffer for communicating to a restore target (i.e., blocks 605, 607, 609, 611, and 617) could be performed after identifying the valid ranges in 511 instead of updating a restore data map. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a standalone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 21:
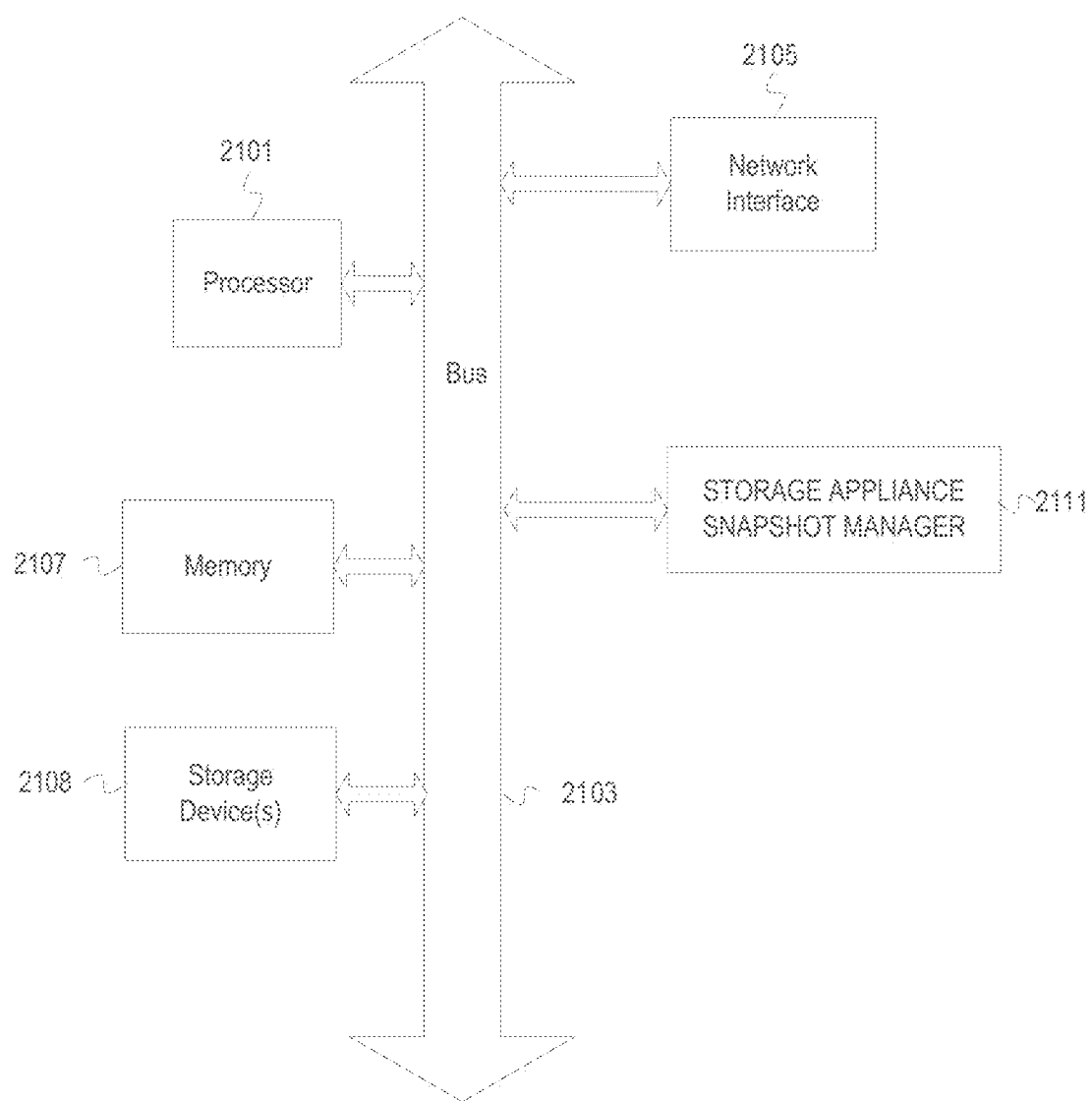
FIG. 21 depicts an example computer system with a storage appliance snapshot manager.

FIG. 21 depicts an example computer system with a storage appliance snapshot manager. The computer system includes a processor 2101 (possibly including multiple processors, multiple cores, multiple nodes, and/or implementing multi-threading, etc.). The computer system includes memory 2107. The memory 2107 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 2103 (e.g., PCI, ISA, PCI-Express, HyperTransport® bus, InfiniBand® bus, NuBus, etc.) and a network interface 2105 (e.g., a Fiber Channel interface, an Ethernet interface, an internet small computer system interface, SONET interface, wireless interface, etc.). The system also includes a storage appliance snapshot manager 2111. The storage appliance snapshot manager 2111 can be configured with either or both of the snapshot layout/arrangement creation and utilization functionality and the synthetic baseline snapshot and eviction state refresh functionality described above. Any one of the previously described functionalities may be partially (or entirely) implemented in hardware and/or on the processor 2101. For example, the functionality may be implemented with an application specific integrated circuit, in logic implemented in the processor 2101, in a co-processor on a peripheral device or card, etc. Further, realizations may include fewer or additional components not illustrated in FIG. 21 (e.g., video cards, audio cards, additional network interfaces, peripheral devices, etc.). The processor 2101 and the network interface 2105 are coupled to the bus 2103. Although illustrated as being coupled to the bus 2103, the memory 2107 may be coupled to the processor 2101.

While aspects of the disclosure are described with reference to various implementations and exploitations, it will be understood that these aspects are illustrative and that the scope of the claims is not limited to them. In general, techniques for arranging snapshot metadata and snapshot data as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

This description uses the term "stream" to refer to a unidirectional stream of data flowing over a data connection between two entities in a session. The entities in the session may be interfaces, services, etc. The elements of the stream can vary in size and formatting depending upon the entities communicating with the session. Although the stream elements will be segmented/divided according to the protocol supporting the session, the entities may be handling the data at an operating system perspective and the stream elements may be data blocks from that operating system perspective. The stream is a "stream" because a data collection (e.g., a volume or directory) is serialized at the source for streaming to a destination. Serialization of the stream elements allows for reconstruction of the data collection at a higher layer than that of the layer corresponding to the serialization.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
in response to receiving a restore request for a data collection and a snapshot, identifying a snapshot key-value store for the data collection and an identifier of the snapshot;
utilizing a global map, tracking snapshots that are represented in the key-value store, to retrieve records from the key-value store using the identifier of the snapshot as a key prefix for identify the records that include a snapshot metadata record comprising inode attributes of the data collection; and
communicating a data file of the snapshot through a buffer and communicating the records to the restore target to restore the data collection based upon the snapshot.

2. The method of claim 1, comprising:
retrieving inode records and directory records as a portion of the records; and
transmitting the inode records and directory records to the restore target.

3. The method of claim 1, comprising:
retrieving data map records as a portion of the records; and
assembling the data file into the buffer according to the data map records.

4. The method of claim 1, comprising:
in response to the snapshot not being a baseline snapshot:
creating an inode attribute structure with inode records of the snapshot;
transmitting directory records to the restore target and track parent inode and child name pairs of the directory records;
creating a restore data map with data map records of the snapshot;
merging the records of the snapshot to the baseline snapshot;
transmitting inode attribute structure to the restore target; and
communicating valid data blocks to restore target based on the restore data map.

5. The method of claim 1, comprising:
in response to receiving a request to delete the snapshot for the data collection, marking the snapshot for deletion;
in response to a reclamation threshold being satisfied for the data collection, identifying identifiers of snapshots marked for deletion; and
for each selected snapshot marked for deletion:
retrieving a first set of records from the key-value store for a valid snapshot subsequent a selected snapshot using a first identifier of the valid snapshot as a first key prefix;
retrieving a second set of records from the key-value store for the selected snapshot using a second identifier of the selected snapshot as a second key prefix;
transferring ownership of valid inode and directory records of the selected snapshot to the valid snapshot;
determining valid data ranges of the selected snapshot and transfer the valid data ranges to the valid snapshot; and
deleting the selected snapshot.

6. The method of claim 1, comprising:
receiving a request to delete the snapshot for the data collection;

retrieving a first set of records from the key-value store for a valid snapshot subsequent a selected snapshot using a first identifier of the valid snapshot as a first key prefix;

retrieving a second set of records from the key-value store for the selected snapshot using a second identifier of the selected snapshot as a second key prefix;

transferring ownership of valid inode and directory records of the selected snapshot to the valid snapshot;

determining valid data ranges of the selected snapshot and transfer the valid data ranges to the valid snapshot; and deleting the selected snapshot.

7. The method of claim 1, comprising:

in response to receiving a file restore request specifying the snapshot, the data collection, and the file, identifying the snapshot key-value store for the data collection and the identifier of the snapshot;

incrementally searching directory records of snapshots for an inode number of the file in reverse time order; and in response to the snapshot being a baseline snapshot, retrieving data map records using the identifier of the snapshot and inode node as a first key prefix and reconstruct the file according to the data map records.

8. The method of claim 1, comprising:

in response to receiving a file restore request specifying the snapshot, the data collection, and the file, identifying the snapshot key-value store for the data collection and the identifier of the snapshot;

incrementally searching directory records of snapshots for an inode number of the file in reverse time order; and in response to the snapshot not being a baseline snapshot, merging data map records across snapshots and reconstruct the file according to merged data map records.

9. A non-transitory machine readable medium comprising instructions for performing a method, which when executed by a machine, causes the machine to:

in response to receiving a restore request for a data collection and a snapshot, identify a snapshot key-value store for the data collection and an identifier of the snapshot;

utilize a global map, tracking snapshots that are represented in the key-value store, to retrieve records from the key-value store using the identifier of the snapshot as a key prefix for identify the records that include a snapshot metadata record comprising inode attributes of the data collection; and communicate a data file of the snapshot through a buffer and communicating the records to the restore target to restore the data collection based upon the snapshot.

10. The non-transitory machine readable medium of claim 9, wherein the instructions cause the machine to:

retrieve inode records and directory records as a portion of the records; and transmit the inode records and directory records to the restore target.

11. The non-transitory machine readable medium of claim 9, wherein the instructions cause the machine to:

retrieve data map records as a portion of the records; and
assemble the data file into the buffer according to the data map records.

12. The non-transitory machine readable medium of claim 9, wherein the instructions cause the machine to:

in response to the snapshot not being a baseline snapshot:
create an inode attribute structure with inode records of the snapshot;

transmit directory records to the restore target and track parent inode and child name pairs of the directory records;

create a restore data map with data map records of the snapshot;

merge the records of the snapshot to the baseline snapshot;

transmit inode attribute structure to the restore target; and communicate valid data blocks to restore target based on the restore data map.

13. The non-transitory machine readable medium of claim 9, wherein the instructions cause the machine to:

in response to receiving a request to delete the snapshot for the data collection, mark the snapshot for deletion;

in response to a reclamation threshold being satisfied for the data collection, identify identifiers of snapshots marked for deletion; and for each selected snapshot marked for deletion:
retrieve a first set of records from the key-value store for a valid snapshot subsequent a selected snapshot using a first identifier of the valid snapshot as a first key prefix;

retrieve a second set of records from the key-value store for the selected snapshot using a second identifier of the selected snapshot as a second key prefix;

transfer ownership of valid inode and directory records of the selected snapshot to the valid snapshot;

determine valid data ranges of the selected snapshot and transfer the valid data ranges to the valid snapshot; and delete the selected snapshot.

14. The non-transitory machine readable medium of claim 9, wherein the instructions cause the machine to:

receive a request to delete the snapshot for the data collection;

retrieve a first set of records from the key-value store for a valid snapshot subsequent a selected snapshot using a first identifier of the valid snapshot as a first key prefix;

retrieve a second set of records from the key-value store for the selected snapshot using a second identifier of the selected snapshot as a second key prefix;

transfer ownership of valid inode and directory records of the selected snapshot to the valid snapshot;

determine valid data ranges of the selected snapshot and transfer the valid data ranges to the valid snapshot; and delete the selected snapshot.

15. The non-transitory machine readable medium of claim 9, wherein the instructions cause the machine to:

in response to receiving a file restore request specifying the snapshot, the data collection, and the file, identify the snapshot key-value store for the data collection and the identifier of the snapshot;

incrementally search directory records of snapshots for an inode number of the file in reverse time order; and in response to the snapshot being a baseline snapshot, retrieve data map records using the identifier of the snapshot and inode node as a first key prefix and reconstruct the file according to the data map records.

16. The non-transitory machine readable medium of claim 9, wherein the instructions cause the machine to:

in response to receiving a file restore request specifying the snapshot, the data collection, and the file, identify the snapshot key-value store for the data collection and the identifier of the snapshot;

incrementally search directory records of snapshots for an inode number of the file in reverse time order; and in response to the snapshot not being a baseline snapshot, merge data map records across snapshots and reconstruct the file according to merged data map records.

17. A computing device comprising:

a memory comprising machine executable code for performing a method; and a processor coupled to the memory, the processor configured to execute the machine executable code to cause the processor to:

in response to receiving a restore request for a data collection and a snapshot, identify a snapshot key-value store for the data collection and an identifier of the snapshot;

utilize a global map, tracking snapshots that are represented in the key-value store, to retrieve records from the key-value store using the identifier of the snapshot as a key prefix for identify the records that include a snapshot metadata record comprising inode attributes of the data collection; and communicate a data file of the snapshot through a buffer and communicating the records to the restore target to restore the data collection based upon the snapshot.

18. The computing device of claim 17, wherein the machine executable code to causes the processor to:

retrieve inode records and directory records as a portion of the records; and transmit the inode records and directory records to the restore target.

19. The computing device of claim 17, wherein the machine executable code to causes the processor to:

retrieve data map records as a portion of the records; and assemble the data file into the buffer according to the data map records.

20. The computing device of claim 17, wherein the machine executable code to causes the processor to:

in response to the snapshot not being a baseline snapshot:

create an inode attribute structure with inode records of the snapshot;

transmit directory records to the restore target and track parent inode and child name pairs of the directory records;

create a restore data map with data map records of the snapshot;

merge the records of the snapshot to the baseline snapshot;

transmit inode attribute structure to the restore target; and communicate valid data blocks to restore target based on the restore data map.

* * * * *